US011006016B2

(12) United States Patent
Tokumaru et al.

(10) Patent No.: US 11,006,016 B2
(45) Date of Patent: May 11, 2021

(54) IMAGE FORMING APPARATUS, IMAGE FORMING METHOD, AND STORAGE MEDIUM

(71) Applicants: Ko Tokumaru, Tokyo (JP); Jun Shiori, Kanagawa (JP); Takuya Murata, Tokyo (JP); Yuji Tanaka, Kanagawa (JP); Takahisa Koike, Tokyo (JP)

(72) Inventors: Ko Tokumaru, Tokyo (JP); Jun Shiori, Kanagawa (JP); Takuya Murata, Tokyo (JP); Yuji Tanaka, Kanagawa (JP); Takahisa Koike, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/810,860

(22) Filed: Mar. 6, 2020

(65) Prior Publication Data

US 2020/0288033 A1    Sep. 10, 2020

(30) Foreign Application Priority Data

Mar. 7, 2019    (JP) .............................. JP2019-041895

(51) Int. Cl.
*H04N 1/04* (2006.01)
*B41J 3/36* (2006.01)
*H04N 1/191* (2006.01)

(52) U.S. Cl.
CPC .............. *H04N 1/0426* (2013.01); *B41J 3/36* (2013.01); *H04N 1/1918* (2013.01)

(58) Field of Classification Search
CPC ............... H04N 1/0426; H04N 1/1918; H04N 1/32117; H04N 1/00225; H04N 1/00973; H04N 2201/0075; H04N 2201/3278; H04N 1/00106; H04N 1/00342; H04N 1/00482; H04N 1/32106; H04N 1/32776; H04N 2007/145; H04N 2201/0055; H04N 2201/3205; H04N 7/147; H04N 1/00811; H04N 1/00822; H04N 1/00824; H04N 1/00962; H04N 1/04; H04N 1/34; H04N 2201/001; H04N 2201/0041; H04N 2201/0081; H04N 2201/3212;
(Continued)

(56) References Cited

U.S. PATENT DOCUMENTS 8,827,442 B1 * 9/2014 Simmons .................... B41J 2/01
  347/109
9,352,598 B2 * 5/2016 Nakata ...................... B41J 29/38
(Continued)

FOREIGN PATENT DOCUMENTS

JP    2001-315385    11/2001

*Primary Examiner* — Negussie Worku
(74) *Attorney, Agent, or Firm* — Xsensus LLP

(57) ABSTRACT

An image forming apparatus is configured to form an image on a recording medium by scanning of the image forming apparatus by a user. The image forming apparatus includes an image forming device and processing circuitry. The image forming device includes a plurality of image forming arrays. Each of the image forming arrays includes an image forming portion configured to form the image. The processing circuitry is configured to set an image forming array to be used to form the image, according to a use mode of the image forming apparatus.

20 Claims, 20 Drawing Sheets

(58) Field of Classification Search
CPC ... H04N 2201/3223; H04N 2201/3269; H04N 2201/3273; H04N 1/00; H04N 1/00015; H04N 1/00018; H04N 1/00204; H04N 1/00233; H04N 1/00278; H04N 1/00315; H04N 1/0032; H04N 1/00344; H04N 1/00347; H04N 1/00355; H04N 1/0036; H04N 1/00363; H04N 1/00371; H04N 1/00374; H04N 1/00392; H04N 1/00413; H04N 1/00456; H04N 1/00493; H04N 1/00514; H04N 1/00588; H04N 1/00602; H04N 1/00623; H04N 1/00657; H04N 1/00689; H04N 1/00779; H04N 1/00795; H04N 1/00801; H04N 1/00809; H04N 1/00854; H04N 1/00949; H04N 1/00968; H04N 1/0097; H04N 1/0405; H04N 1/1061; H04N 1/2338; H04N 1/32; H04N 1/32026; H04N 1/32101; H04N 1/32122; H04N 1/32144; H04N 1/32496; H04N 1/32786; H04N 1/32797; H04N 1/3873; H04N 1/3878; H04N 1/4433; H04N 2101/00; H04N 21/4126; H04N 21/44008; H04N 21/4725; H04N 21/47815; H04N 21/8133; H04N 21/8186; H04N 21/8583; H04N 2201/0018; H04N 2201/0039; H04N 2201/0043; H04N 2201/0084; H04N 2201/0087; H04N 2201/3202; H04N 2201/3209; H04N 2201/3233; H04N 2201/3246; H04N 2201/3264; H04N 2201/3266; H04N 2201/3271; H04N 2201/3274; H04N 2201/3276; H04N 5/2226; H04N 7/185; B41J 3/36; B41J 2/01; B41J 3/407
USPC .......................................................... 358/474
See application file for complete search history.

(56) References Cited

U.S. PATENT DOCUMENTS

| | | | |
|---|---|---|---|
| 9,440,452 B2* | 9/2016 | Harada | B41J 2/04505 |
| 2003/0081270 A1* | 5/2003 | Hoshino | H04N 1/107 |
| | | | 358/474 |
| 2008/0144053 A1* | 6/2008 | Gudan | B41J 3/36 |
| | | | 358/1.8 |
| 2014/0016958 A1 | 1/2014 | Yabuuchi et al. | |
| 2014/0270835 A1 | 9/2014 | Umezawa et al. | |
| 2016/0193774 A1* | 7/2016 | Martena | B29C 48/313 |
| | | | 264/40.1 |
| 2016/0349101 A1 | 12/2016 | Yamamoto et al. | |
| 2018/0061085 A1* | 3/2018 | Ikami | H04N 1/4076 |
| 2019/0286038 A1 | 9/2019 | Seki et al. | |
| 2020/0171837 A1* | 6/2020 | Tsuchiya | B41J 19/147 |

* cited by examiner

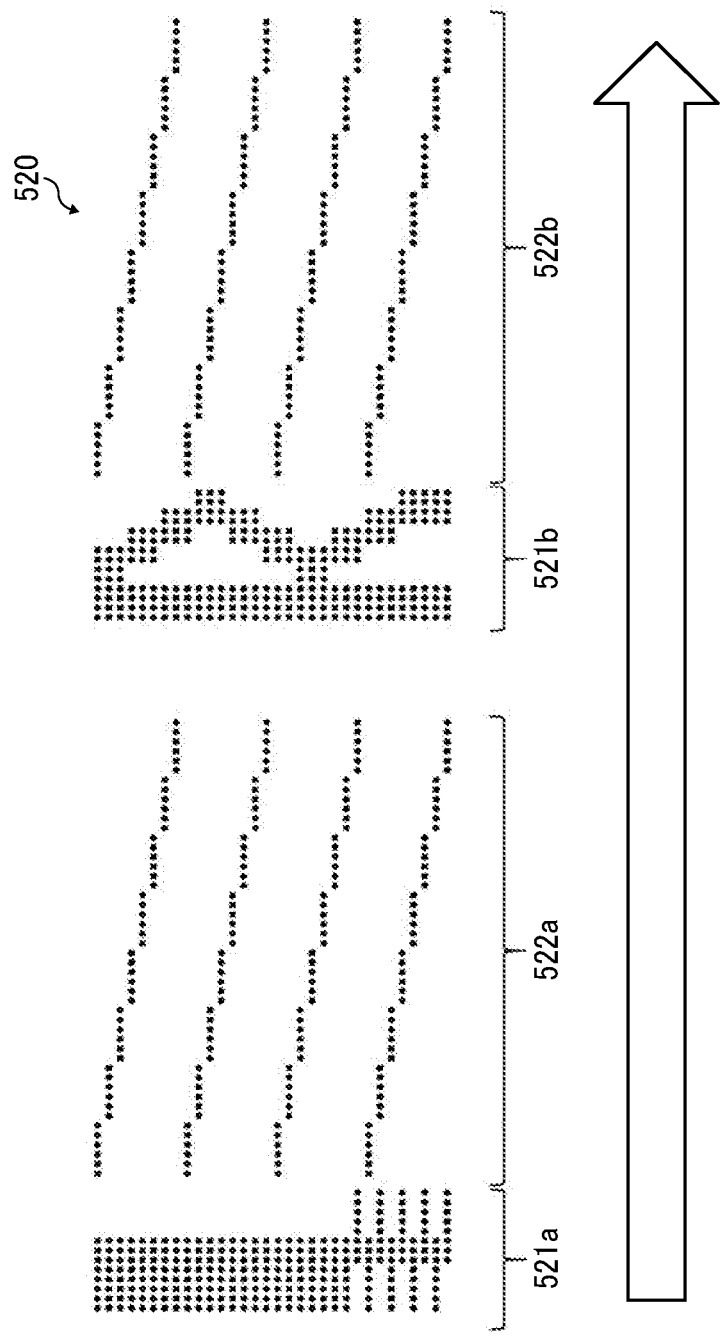

IMAGE FORMING APPARATUS, IMAGE FORMING METHOD, AND STORAGE MEDIUM

CROSS-REFERENCE TO RELATED APPLICATION

This patent application is based on and claims priority pursuant to 35 U.S.C. § 119(a) to Japanese Patent Application No. 2019-041895, filed on March 7, 2019, in the Japan Patent Office, the entire disclosure of which is hereby incorporated by reference herein.

BACKGROUND

Technical Field

Aspects of the present disclosure relate to an image forming apparatus, an image forming method, and a storage medium.

Related Art

In recent years, an image forming apparatus used for outputting digitized information has become an indispensable device. With the miniaturization and portability of devices (image information output devices) such as computers that output image data using this image forming apparatus, there has been increasing the demand for miniaturization and portability of the image forming apparatuses.

In response to image data from a data output device such as a smart device (e.g., smartphone) or a computer (e.g., personal computer), the handheld printer scans freely (freehand) on a recording medium (e.g., notebook or standard paper) to form (or record) an image.

In such a handheld printer, nozzles of an ink discharge head are always filled with ink so that printing can be performed immediately in response to a printing instruction. Therefore, when the discharge operation is not performed for a long time, ink is continuously exposed to the air. Volatile components such as the water content of ink evaporate and the viscosity of ink increases, which may cause clogging of nozzles and non-discharge of ink.

For not a handheld printer but a device that discharge ink to form an image, a recovery process of periodically performing forcible discharge (dummy discharge or preliminary discharge) or suction of thicken ink to eliminate such discharge failure and non-discharge of ink (included in discharge failure). In the recovery process, as a test operation also serving as maintenance, check pattern printing is performed to check the state of clogging of nozzles and the degree of recovery by the recovery process.

As an image forming apparatus that performs the above-described recovery process, for example, an image forming apparatus is known that detects a droplet discharge state under discharge conditions preset for a droplet discharge head having a plurality of nozzles and control the timing of performing the recovery process for nozzles based on the detection results.

SUMMARY

In an aspect of the present disclosure, there is provided an image forming apparatus configured to form an image on a recording medium by scanning of the image forming apparatus by a user. The image forming apparatus includes an image forming device and processing circuitry. The image forming device includes a plurality of image forming arrays. Each of the image forming arrays includes an image forming portion configured to form the image. The processing circuitry is configured to set an image forming array to be used to form the image, according to a use mode of the image forming apparatus.

In another aspect of the present disclosure, there is provided a method for forming an image on a recording medium by scanning of an image forming apparatus by a user, the image forming apparatus including a plurality of image forming arrays, each of which includes an image forming portion configured to form the image. The method includes setting an image forming array to be used to form the image, among the plurality of image forming arrays, according to a use mode of the image forming apparatus.

In still another aspect of the present disclosure, there is provided a non-transitory recording medium storing computer readable code for causing an image forming apparatus to execute a process of forming an image on a recording medium by scanning of the image forming apparatus by a user. The image forming apparatus includes a plurality of image forming arrays, each of which includes an image forming portion configured to form the image. The process includes setting an image forming array to be used to form the image, among the plurality of image forming arrays, according to a use mode of the image forming apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 15 is an illustration of another example of the pattern image used in the maintenance mode of the handheld printer;

Figure 1A:
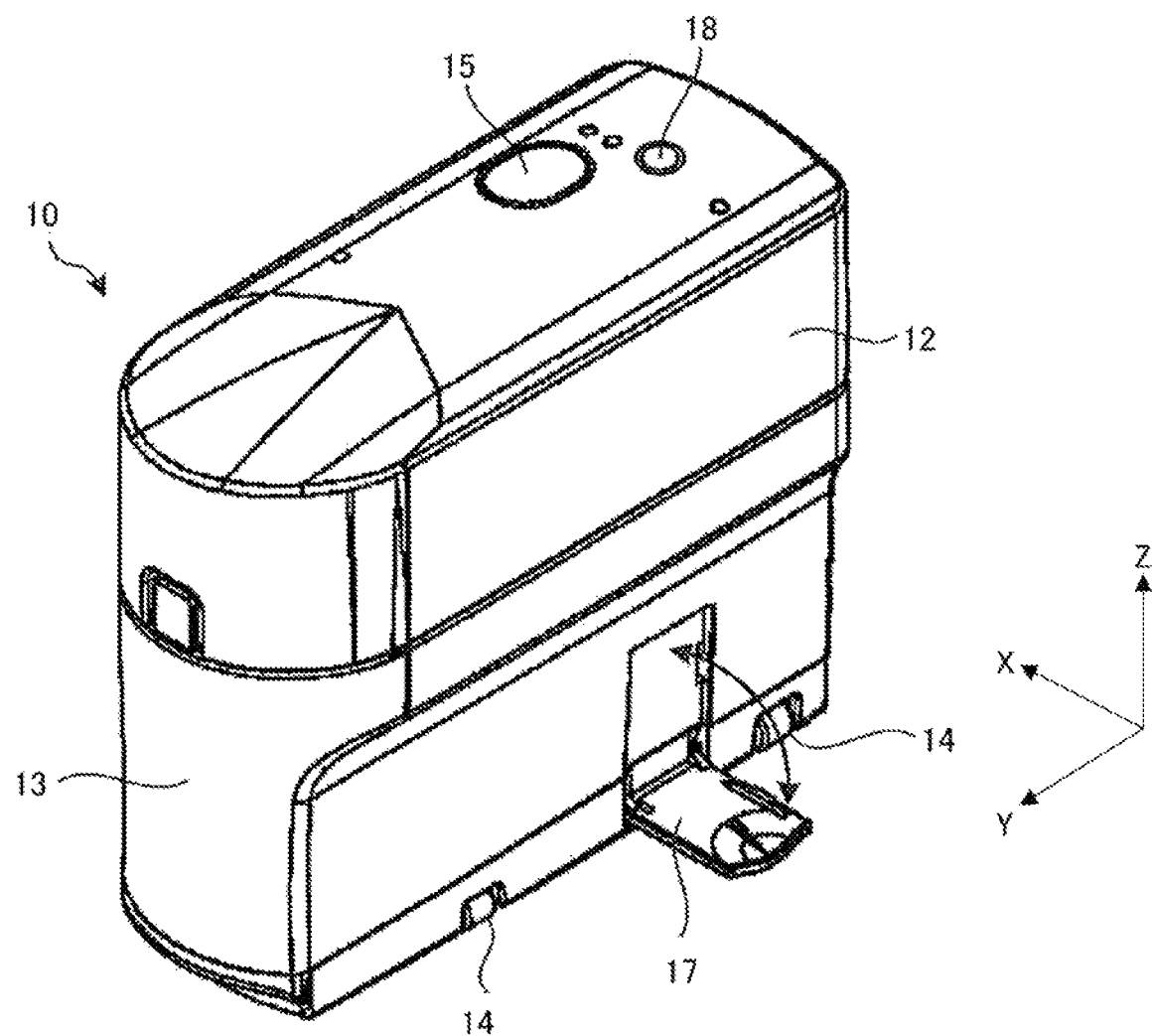
FIG. 1A is an external perspective view of a handheld printer according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

For example. an image forming apparatus to discharge ink may have a configuration to perform forcible discharge, maintenance printing, and the like to resolve discharge failure and non-discharge of ink. However, in particular, a handheld printer may have no room for such a configuration. Therefore, it is necessary to eliminate discharge failure and non-discharge of ink by a method different from the conventionally known recovery process.

Further, when ink is discharged to form an image as in a handheld printer, the discharge direction of ink may not be an ideal direction but be shifted obliquely with respect to a recording medium. The cause of such a shift in the discharge direction is often due to tolerances in manufacturing the droplet discharge head.

The mode (inclination direction) of the shift (inclination) of the discharge direction of droplet is due to an individual difference of each device. On the other hand, for a device of which a user manually determines the scanning direction as in a handheld printer, when the inclination of the discharge direction is opposite the scanning direction, the image quality may be greatly affected. Therefore, in particular, in the case of a handheld printer, it is desirable to control the discharge operation so as to reduce the influence of the inclination direction of the ink discharge according to the print mode or device setting state in which the scanning direction is specified.

Hereinafter, an image forming apparatus, an image forming method, and a recording medium storing a control program according to embodiments of the present disclosure are described in detail with reference to the drawings.

External Configuration of Handheld Printer 10

Figure 1B:
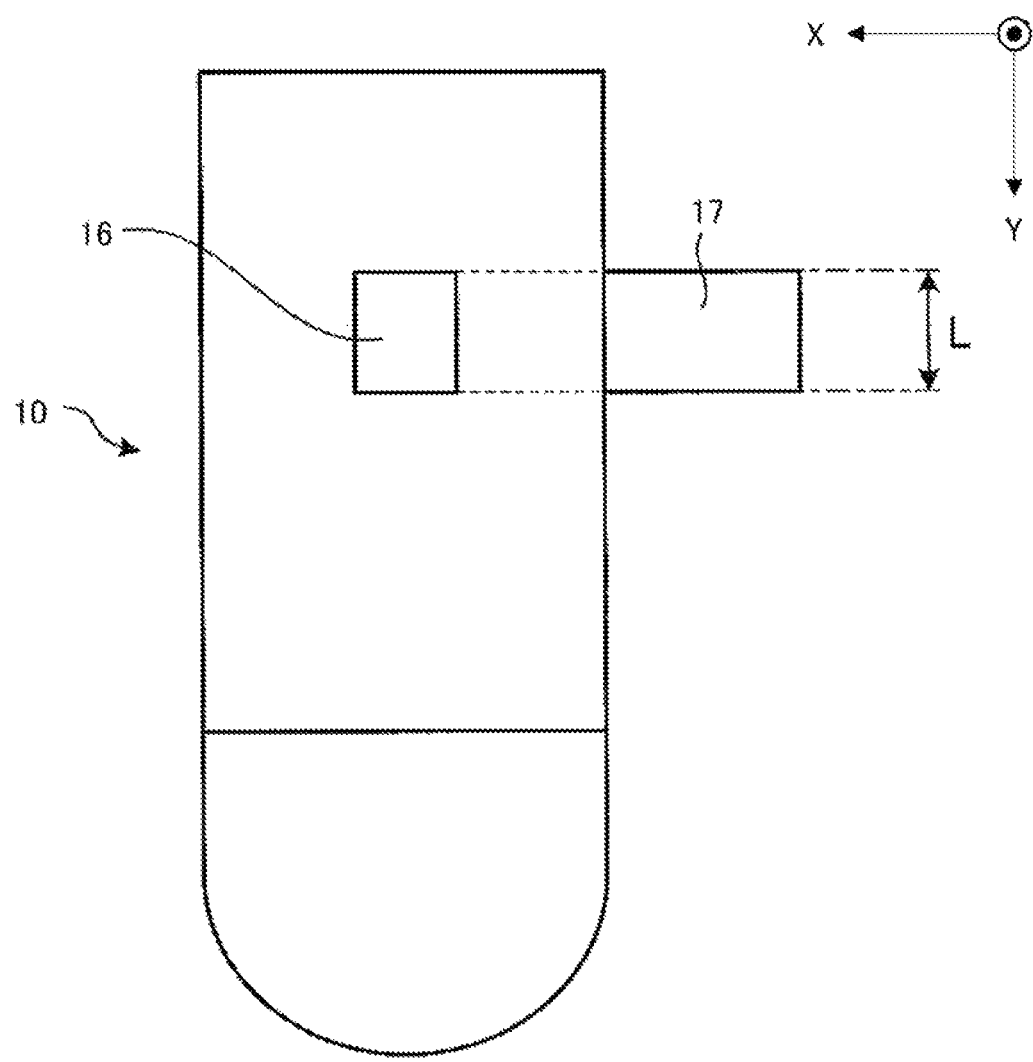
FIG. 1B is a bottom view of the handheld printer illustrated in FIG. 1A.

Referring now to FIGS. 1A and 1B, a description is given of an external configuration of a handheld printer 10 as an image forming apparatus according to an embodiment of the present disclosure. As illustrated in FIG. 1A, the handheld printer 10 includes an upper unit 12 and a lower unit 13.

A control board is mounted inside the upper unit 12. On an upper surface of the upper unit 12 are provided an operation button 15 to perform various operations and a light emitting diode (LED) 18 to display an operation state of the handheld printer 10 and the like.

The operation button 15 is a button for a user to perform operations such as a normal image forming operation and execution of a maintenance process described later. The LED 18 is a light emitting element to display as operation states of the handheld printer 10, for example, that an image forming operation is being performed, that image data is being received, and that a maintenance process is being performed. In the following description, a process of forming an image or character on a recording medium by an image forming process or an image forming operation may be generally referred to as "printing" or "printing process".

The lower unit 13 has an inkjet (IJ) recording head 108 as an example of an image forming device to discharge ink. The lower unit 13 further includes guide rollers 14 and a guide 17. The guide rollers 14 assist the movement of a body of the handheld printer 10 in a lateral direction (i.e., scanning direction). The guide 17 is disposed on one side surface. As illustrated in FIG. 1A, assuming three-dimensional axes, the scanning direction of the handheld printer 10 is an X direction (more exactly, both directions of +X direction and −X direction).

The guide 17 is a member to grasp an area in which an image is actually formed on a recording medium when the handheld printer 10 is scanned to form an image. FIG. 1A illustrates a state in which the guide 17 is opened from the side surface. The guide 17 is set in the open state illustrated in FIG. 1A to grasp an area (printing area) in which an image is formed with the guide 17. When the guide 17 is not used, the guide 17 is pivoted about a lower end of the guide 17 serving as a hinge and housed in the side surface of the body.

As illustrated in FIG. 1B, the handheld printer 10 has an opening 16 that is open on a lower surface of the lower unit 13. Ink discharged from the IJ recording head 108 reaches a recording medium, such as a sheet of paper, from the opening 16 to form or record an image. As illustrated in FIG. 1B, the guide 17 is located on an extension of the opening 16 in the scanning direction. The width L of the guide 17 in the longitudinal direction of the handheld printer 10 is substantially the same as the width of the opening 16 in the longitudinal direction. Thus, at the time of scanning to form an image, the image forming area (printing area) can be grasped using the position of the guide 17 in the scanning direction of the handheld printer 10 (transverse direction of the handheld printer 10) as a guide. Note that the guide 17 may be, e.g., transparent in color. Accordingly, at the time of the printing operation, the printing state on the recording medium below the guide 17 in the opened state can be checked.

Scanning in Image Formation by Handheld Printer 10

Figure 2:
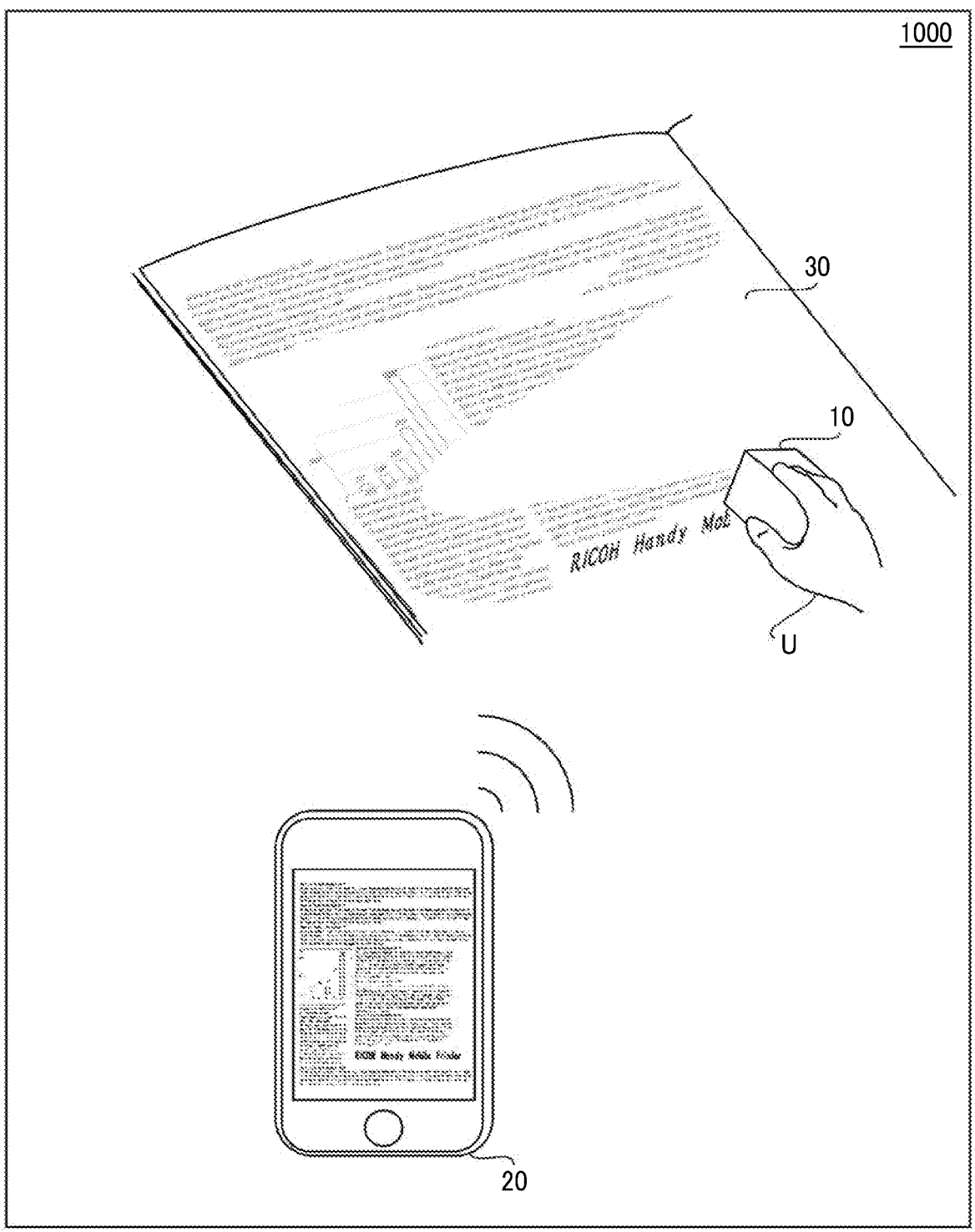
FIG. 2 is an illustration of a state in which image forming scanning is performed using the handheld printer.

FIG. 2 is an illustration of a state of manual scanning in execution of a printing process using the handheld printer 10 according to an embodiment of the present disclosure. As illustrated in FIG. 2, first, the handheld printer 10 receives, from the image data transmitting device 20, image data used for a printing operation to form an image on a sheet 30 as an example of a recording medium. The image data transmitting device 20 provides a user interface for the user U to select data to be printed and to issue a printing instruction to the handheld printer 10. As the image data transmitting device 20, a portable information processing terminal such as a smartphone and an information processing device such as a personal computer (PC) can be applied.

The user U determines the data to be printed in the image data transmitting device 20, notifies the handheld printer 10 of the data, and then operates the operation button 15 of the handheld printer 10 to determine the initial position on the sheet 30 and start the printing operation. When the initial position on the sheet 30 is determined, the handheld printer 10 can grasp the image forming position of the image data on the sheet 30 based on the initial position.

As described later, the handheld printer 10 includes the navigation sensor 105 and the gyro sensor 106 and thus sequentially monitors its own position and orientation from the initial position during execution of manual scanning by the user U. Therefore, as illustrated in FIG. 2, when the user scans the handheld printer 10 on the sheet 30 by freehand, the handheld printer 10 can continuously calculate the positions of nozzles (ink discharge ports) of the recording head based on the position and orientation information from the navigation sensor 105 and the gyro sensor 106. Therefore, at each position on the sheet 30, the handheld printer 10 can specify which part of the image data should be printed from which nozzle. Thus, the user U can form (print) a predetermined image based on the image data on the sheet 30 even when the handheld printer 10 is moved in a free direction to scan on the sheet 30 by freehand.

Hardware Configuration of Handheld Printer 10

Figure 3:
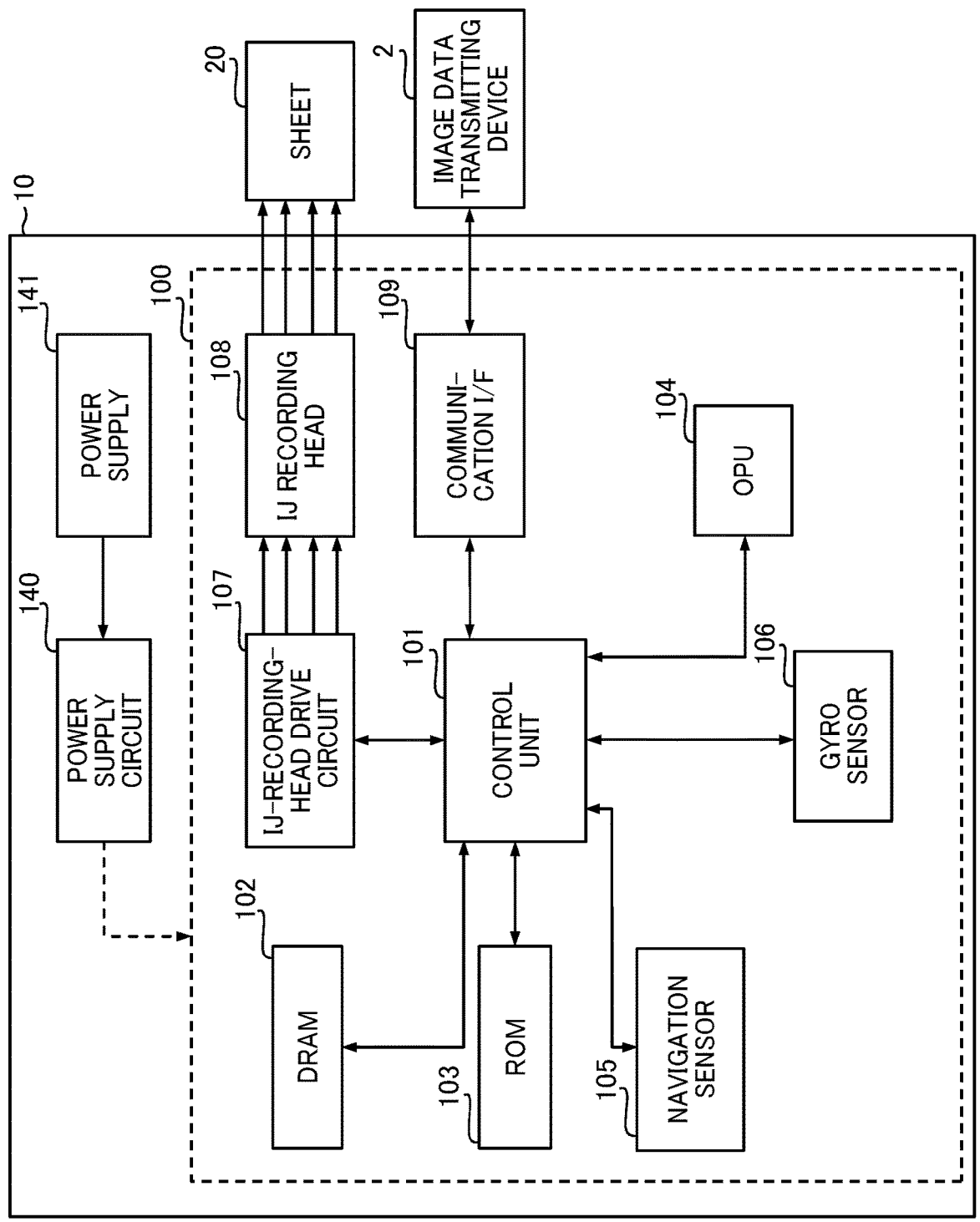
FIG. 3 is a block diagram illustrating a hardware configuration of the handheld printer.

Next, the hardware configuration of the handheld printer 10 is described with reference to FIG. 3. As illustrated in FIG. 3, the handheld printer 10 includes hardware similar to hardware of a general computer, and includes a control unit 101, a power supply circuit 140, a power supply 141, a dynamic random access memory (DRAM) 102, a read only memory (ROM) 103, and an operation panel unit (OPU) 104, a navigation sensor 105, a gyro sensor 106, an inkjet (IJ) recording head drive circuit 107, an IJ recording head 108, and a communication interface (I/F) 109.

The control unit 101 controls the entire operation of the handheld printer 10. The functional configuration of the control unit 101 is described later. The control unit 101 is electrically connected to the DRAM 102, the ROM 103, the OPU 104, the navigation sensor 105, the gyro sensor 106, the IJ-recording-head drive circuit 107, and the communication I/F 109.

As the power supply 141 can be used, for example, a dry battery, a rechargeable battery, a solar battery, or a fuel battery. The power supply circuit 140 is connected to each device surrounded by a broken line 100 in FIG. 3 by an electric wire, and distributes the power supplied by the power supply 141 to each device of the handheld printer 10.

The power supply circuit 140 raises or lowers the voltage of the power supply 141 to a voltage suitable for each device when distributing power to each device of the handheld printer 10. When a rechargeable-and-dischargeable battery is used as the power supply 141, the power supply 141 has a function of charging the battery. For example, the power supply circuit 140 detects connection of a commercial power supply to the handheld printer 10 and connects the power supply 141 to a circuit for charging the power supply 141.

The DRAM 102 is a volatile storage medium to store image data received from the image data transmitting device 20 via the communication I/F 109 or record firmware expanded from the ROM 103. The DRAM 102 also stores and updates history information indicating the history of use of the handheld printer 10 and information (use state information) indicating the use state of the IJ recording head 108, such as the cumulative count of ink discharge operations in the recording head (IJ recording head 108). The DRAM 102 is used as a work memory when the central processing unit (CPU) 111 (see FIG. 4) of the control unit 101 executes firmware.

The ROM 103 is a non-volatile storage medium to store various programs such as firmware for performing hardware control of the handheld printer 10 executed by the control unit 101. The ROM 103 also stores, for example, drive waveform data for causing the IJ recording head 108 to perform an discharge operation and initial setting data of the handheld printer 10.

The OPU 104 is an operation display unit that also serves as the operation button 15 to receive an operation from the user U and a display unit to display a state of the handheld printer 10. The OPU 104 includes an LED 18, a switch (for example, an LED switch and a power switch), and the like. As the OPU 104 may be used, for example, a display mechanism, such as a liquid crystal panel or a touch panel display, or a sound generation mechanism that generates sound. The control unit 101 recognizes the operation of the user U on the OPU 104 as an "operation start trigger" for instructing the handheld printer 10 to start executing an image forming operation (specific processing operation) or an "operation end trigger" for instructing the end of the image forming operation. The OPU 104 constitutes at least part of an operation receiving unit.

The navigation sensor 105 is a sensor that detects and outputs a moving amount, an acceleration, and the like at the position of the handheld printer 10 and the IJ recording head 108 as the recording head at each sampling cycle. As a configuration of the navigation sensor 105, for example, an optical distance measuring sensor is used in which a light source such as a light emitting diode or a laser is combined with an image pickup device that images the sheet 30. Note that an acceleration sensor may be used as the configuration of the navigation sensor 105.

The optical distance measuring sensor constituting the navigation sensor 105 can detect an edge that is a change point of the color or brightness of the surface of the sheet 30 according to the scanning of the handheld printer 10 by the operation of the user U on the sheet 30. A detection signal of an edge with the navigation sensor 105 is input to the control unit 101. The control unit 101 calculates the moving amount of the handheld printer 10 based on the distance between edges.

The gyro sensor 106 can detect a rotation angle θ (amount of rotation) by detecting an angular velocity due to movement of the handheld printer 10 and integrating the detected angular velocity. The posture (inclination) of the handheld printer 10 can be determined based on the detection results of the gyro sensor 106. Thus, the control unit 101 can determine a state in which normal printing may be hindered by, for example, floating of the handheld printer 10 from the sheet 30 in manual scanning for performing printing. Further, when the navigation sensor 105 includes an acceleration sensor, the orientation and inclination of the body of the handheld printer 10 can be more accurately detected by combining the detection result of the navigation sensor 105 with the detection result of the gyro sensor 106. The navigation sensor 105 and the gyro sensor 106 function as a moving amount detector.

The IJ-recording-head drive circuit 107 generates a drive voltage for driving the IJ recording head 108 based on the drive waveform data output from the control unit 101. The IJ-recording-head drive circuit 107 generates a drive voltage according to the size of ink droplets discharged from the IJ recording head 108. Further, as described later, the IJ-recording-head drive circuit 107 controls the IJ recording head 108 to set which of the rows of the ink discharge ports (nozzles) of the IJ recording head 108 is used to perform the discharge operation.

The IJ recording head 108 is a droplet discharge device to discharge ink (droplets) and corresponds to an external output unit to execute an external output based on a result of data processing. In the present embodiment, a configuration capable of discharging four color inks of cyan (C), magenta (M), yellow (Y), and black (K) is exemplified. In some embodiments, a configuration of discharging a single color ink or a configuration of discharging five or more colors of ink may be used. The IJ recording head 108 discharges ink toward the sheet 30 by the drive voltage output from the IJ-recording-head drive circuit 107. An image is formed on the sheet 30 by the discharged ink.

As a driving method of the IJ recording head 108 can be used, for example, a piezo method using a piezoelectric element such as a piezo element or a thermal method using bubbles generated by heating ink to discharge ink.

In the present embodiment, it is assumed that various information used for determining the moving direction and the moving amount of the handheld printer 10 with the navigation sensor 105 are stored in a storage medium, such as the ROM 103, in advance. Here, the "various information" refers to, for example, the distance from the navigation sensor 105 to an end of the IJ recording head 108 and the distance between a nozzle arranged at a position closest to an end of the IJ recording head 108 and the end of the IJ recording head 108. Various information further includes a distance between nozzles arranged in the IJ recording head 108 and the like.

The communication I/F 109 establishes a connection for performing data communication with an external device through communication conforming to various wireless communication standards, for example, a wireless local area network (LAN) or near field communication (NFC), or wired communication such as a wired LAN or universal serial bus (USB). Via the communication I/F, the handheld printer 10 communicates with external devices, such as the image data transmitting device 20 and other information processing devices. Note that the communication I/F 109 has a configuration capable of simultaneously establishing a plurality of connections and can simultaneously establish a data communication enabled state with a plurality of external devices.

Therefore, the communication I/F 109 constitutes a data receiving unit including a wired communication device and a wireless communication device. The communication I/F 109 also constitutes a result output unit to output determination result information including a determination result of the state of the handheld printer 10 to the connected image data transmitting device 20.

Configuration of Ink Discharge Ports (Nozzles)

Figure 10:
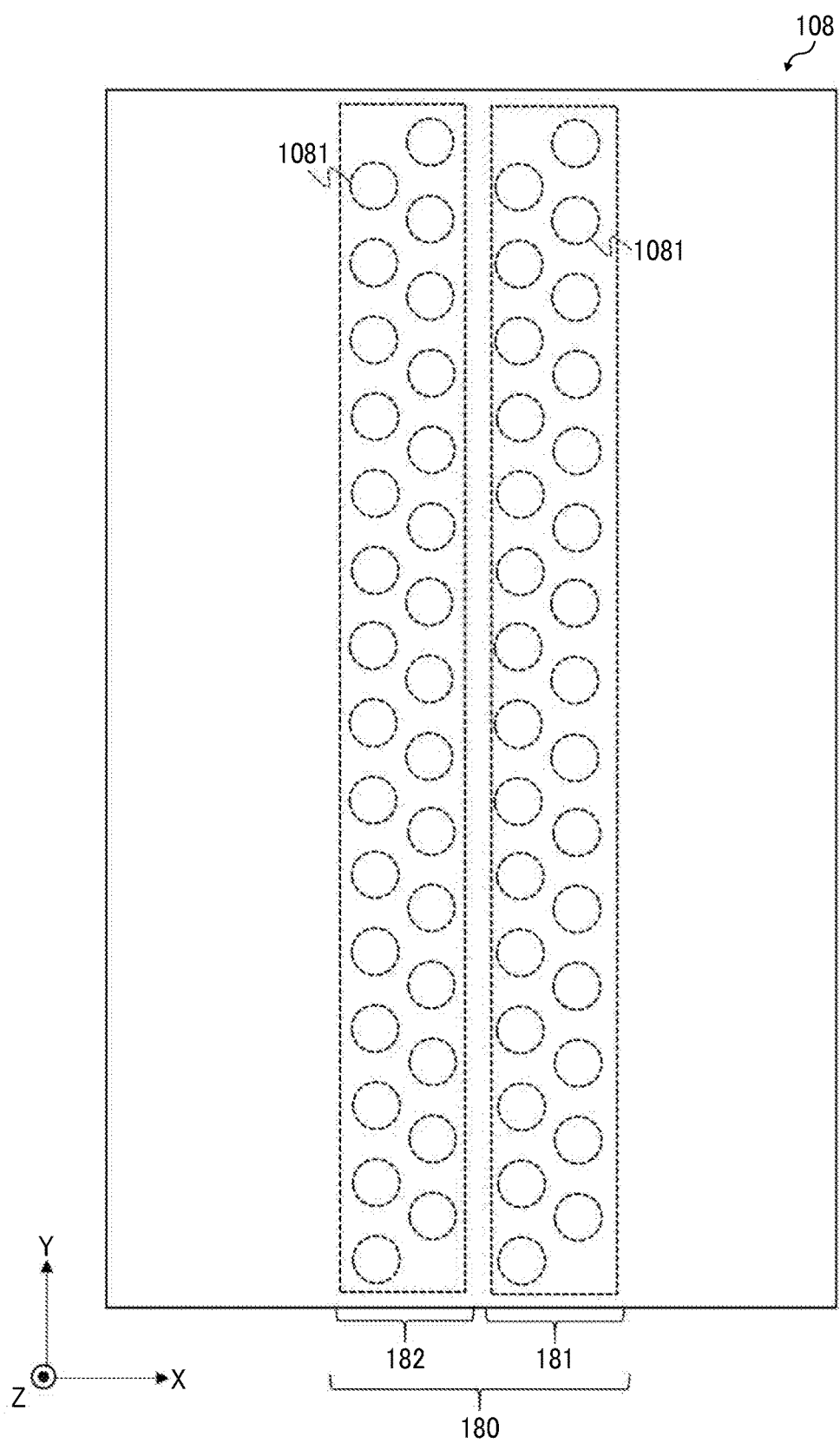
FIG. 10 is a diagram of a configuration example of nozzle arrays of the handheld printer.

Here, the configuration of the ink discharge ports (nozzles) included in the IJ recording head 108 is described with reference to FIG. 10. FIG. 10 is a plan view of an example of an ink discharge surface of the IJ recording head 108 when the handheld printer 10 is viewed from the Z direction (from above). As illustrated in FIG. 10, in the IJ recording head 108, a plurality of nozzle orifices 1081 is arrayed in a staggered manner. A plurality of nozzle orifices 1081 are arranged in the Y direction to form a nozzle orifice group. A plurality of nozzle orifice groups forms a nozzle group 180. The nozzle orifice 1081 corresponds to an image forming portion. Therefore, the nozzle group 180 corresponds to a group including a plurality of image forming arrays in each of which the nozzle orifices 1081 are arrayed.

As illustrated in FIG. 10, the nozzle group 180 according to the present embodiment has, for example, a first nozzle array 181 and a second nozzle array 182. Each of the first nozzle array 181 and the second nozzle array 182 corresponds to any image forming array. Further, any of the nozzle orifices 1081 included in the first nozzle array 181 and the second nozzle array 182 corresponds to the image forming portion and performs an ink discharging operation to form an image under the control of the IJ recording head drive circuit 107. Note that the handheld printer 10 according to the present embodiment described below controls the IJ recording head 108 to discharge droplets from the nozzle orifices 1081 included in any one of the first nozzle array 181 and the second nozzle array 182 when performing an image forming operation on output image data specified by the user U. Here, the nozzle array used for discharging droplets corresponds to a used image forming array.

Although the nozzle group 180 illustrated in FIG. 10 has two nozzle arrays (the first nozzle array 181 and the second nozzle array 182), the configuration of the handheld printer 10 is not limited to the configuration illustrated in FIG. 10. The number of nozzle arrays may be two or more.

The first nozzle array 181 and the second nozzle array 182 are respectively arranged in both directions (+X direction and −X direction) from the middle of the dimension of the handheld printer 10 in the X direction (a boundary passing through the center of the handheld printer 10 in the X direction). When the handheld printer 10 performs an image forming operation by manual scanning, a predetermined image can be formed if any one of the first nozzle array 181 and the second nozzle array 182 performs a discharging operation.

The ink discharge direction is inclined with respect to the sheet 30 due to the directions of the nozzle orifices 1081 in the IJ recording head 108 and variations in the manufacture of the ink discharge mechanism. The direction and amount of inclination vary among individual products. The ink discharged from the nozzles of the first nozzle array 181 (or the second nozzle array 182) included in one handheld printer 10 is inclined in substantially the same direction.

The IJ recording head 108 is a functional component that discharges or jets liquid from the nozzle orifices 1081. The liquid to be discharged is not particularly limited as long as the liquid has a viscosity and a surface tension with which the liquid can be discharged from the IJ recording head 108. For example, the viscosity is preferably 30 mPa·s or less at ordinary temperature and ordinary pressure or by heating or cooling. More specifically, this includes solutions, suspensions, emulsions or the like including solvents such as water and organic solvents, colorants such as dyes and pigments, functional materials such as polymerizable compounds, resins, and surfactants, biocompatible materials such as deoxyribonucleic acid (DNA), amino acids, proteins, and calcium, edible materials such as natural pigments; they may be used as, for example, inkjet inks, surface treatment liquids, forming liquids of components of electronic elements and light emitting elements, and electronic circuit resist patterns, and three-dimensional fabricating material liquids.

Internal Functional Block of Control Unit 101

Figure 4:
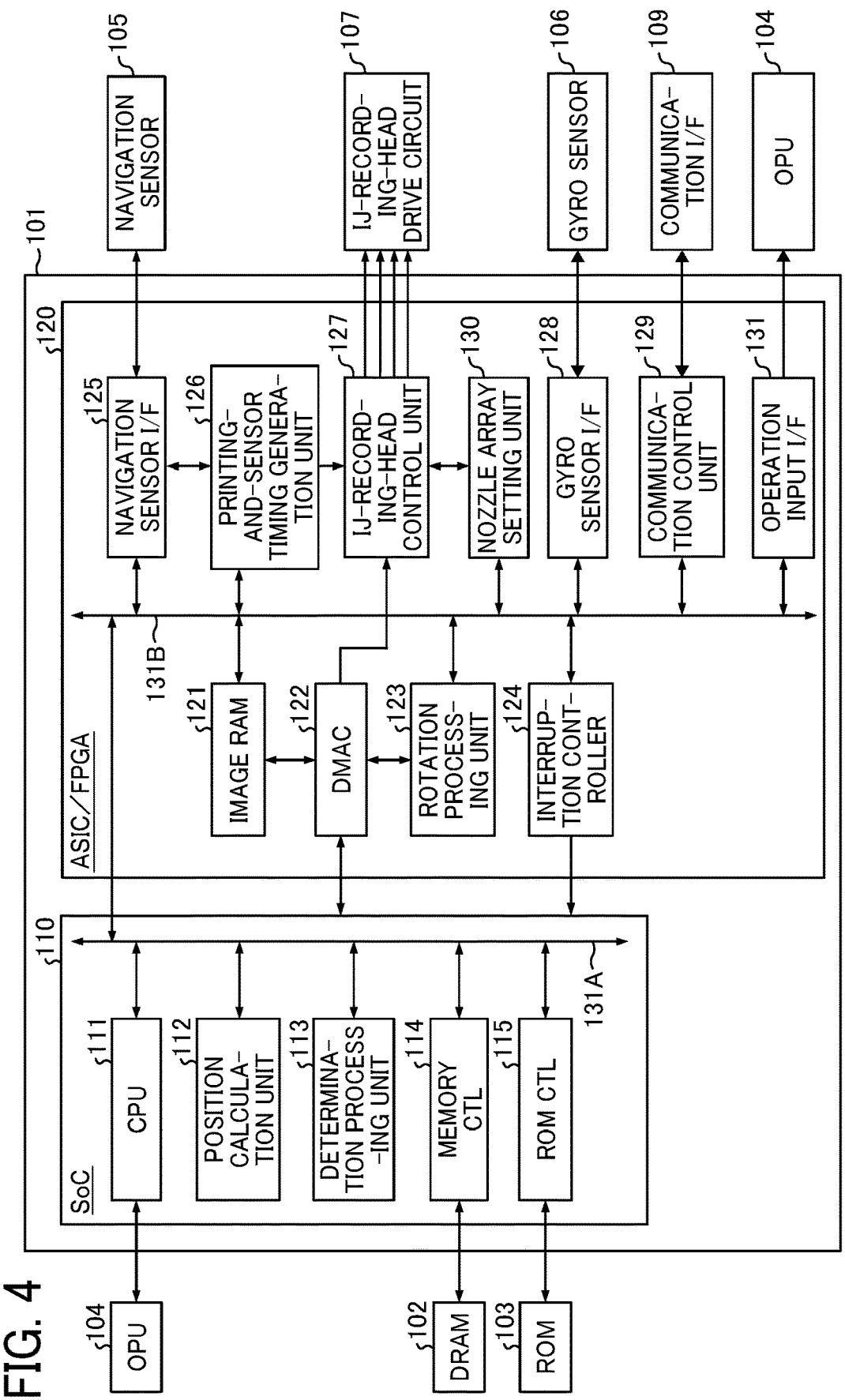
FIG. 4 is a block diagram illustrating a configuration of a control unit of the handheld printer.

Next, an internal configuration of the control unit 101 according to the present embodiment is described with reference to FIG. 4. FIG. 4 is a functional block diagram of a configuration of the control unit 101 according to the present embodiment. The control unit 101 according to the present embodiment includes a system on chip (SoC) 110 and an application specific integrated circuit (ASIC)/field programmable gate array (FPGA) 120. Communication between the SoC 110 and the ASIC/FPGA 120 is performed via buses 131A and 131B.

Note that the ASIC/FPGA 120 may be designed using any of an ASIC implementation technology and an FPGA implementation technology. The ASIC/FPGA 120 may be configured to use an implementation technology other than the ASIC and the FPGA. The SoC 110 and the ASIC/FPGA 120 may be mounted on one chip or substrate instead of separate chips, or on three or more chips or substrates.

The SoC 110 includes a CPU 111, a position calculation unit 112, a determination processing unit 113, a memory controller (CTL) 114, and a ROM CTL 115 connected via the bus 131A. The SoC 110 may be configured to include functions other than the above-described functions.

The ASIC/FPGA 120 includes an image RAM 121, a direct memory access controller (DMAC) 122, a rotation processing unit 123, an interruption controller 124, a navigation sensor I/F 125, a printing-and-sensor timing generation unit 126, a IJ-recording-head control unit 127, a gyro sensor I/F 128, a communication control unit 129, a nozzle array setting unit 130, and an operation input I/F 131 that are connected via the bus 131B. The ASIC/FPGA 120 may include functions other than the above-described functions.

The CPU 111 executes, for example, firmware developed from the ROM 103 to the DRAM 102 to control the operations of the position calculation unit 112, the determination processing unit 113, the memory CTL 114, and the ROM CTL 115 in the SoC 110. The CPU 111 further controls the operations of the image RAM 121, the DMAC 122, the rotation processing unit 123, the interruption controller 124, the navigation sensor I/F 125, the printing-and-sensor timing generation unit 126, the IJ-recording-head control unit 127, the gyro sensor I/F 128, the communication control unit 129, the nozzle array setting unit 130, and the operation input I/F 131 in the ASIC/FPGA 120. The CPU 111 controls the above-described components to achieve the functions of the components constituting the handheld printer 10.

The position calculation unit 112 calculates the position of the handheld printer 10 based on the amount of movement of the handheld printer 10 input from the navigation sensor 105 and the gyro sensor 106 at each sampling cycle. The position of the handheld printer 10 is exactly the position of the nozzles of the IJ recording head 108. However, if the position at which the navigation sensor 105 exists is known, the position of the nozzles can be calculated. The value detected by the navigation sensor 105 (the amount of movement in the X and Y directions) and the value detected by the gyro sensor 106 (angular velocity) are used to calculate the current two-dimensional position coordinates with respect to the origin. Therefore, it is desirable that both inputs (sampling periods) be synchronized.

The position calculation unit 112 calculates the position of the navigation sensor 105 based on a predetermined origin, for example, the initial position of the handheld printer 10 at the start of an image formation output. The position calculation unit 112 estimates the moving speed and the moving direction of the handheld printer 10 in the next sampling cycle based on the difference between the past calculation result of the position of the navigation sensor 105 and the newest calculation result of the position of the navigation sensor 105.

The position calculation unit 112 may be configured to predict the position of the navigation sensor 105 in the next sampling cycle based on the estimation result of the moving speed and the moving direction of the handheld printer 10.

The determination processing unit 113 determines whether the image area is scanned based on the calculation result of the position of the handheld printer 10 by the position calculation unit 112 and the image area information received from the image data transmitting device 20. The determination processing unit 113 determines image data for executing image formation corresponding to the current position on the handheld printer 10.

The determination processing unit 113 determines whether the nozzle group 180 used for the discharge operation in the IJ recording head 108 is the first nozzle array 181 or the second nozzle array 182.

The determination processing unit 113 determines the setting state of the operation mode of the handheld printer 10 input from the operation input I/F 131.

As described above, the position of the handheld printer 10 is exactly the position of the nozzle orifice 1081 (nozzle group 180) provided in the IJ recording head 108, but if the position where the navigation sensor 105 exists is known, the position of the nozzle orifice 1081 (nozzle group 180) can be calculated. Therefore, the determination processing unit 113 may calculate the position of the nozzle orifices 1081 (nozzle group 180) arranged on the IJ recording head 108 from the calculation result of the position of the handheld printer 10 and determine whether the position of the nozzle orifices 1081 (nozzle group 180) is a position capable of scanning the image area.

Note that the "image area information" is information determined based on image data selected by the user U as an image formation output by the handheld printer 10. The image area information is information indicating an area on the sheet 30 in which the image data selected as an image formation output target is formed.

The memory CTL 114 is an I/F with the DRAM 102 and requests data from the DRAM 102. The memory CTL 114 transfers firmware acquired from the DRAM 102 to the CPU 111 and transfers image data acquired from the DRAM 102 to the ASIC/FPGA 120.

The ROM CTL 115 is an I/F with the ROM 103 and requests data from the ROM 103. The ROM CTL 115 transfers the data acquired from the ROM 103 to the CPU 111 or the ASIC/FPGA 120.

The image RAM 121 temporarily stores the image data acquired by the DMAC 122. That is, image data is buffered in the image RAM 121, and a peripheral image corresponding to the position of the handheld printer 10 is read from the image data buffered in the image RAM 121.

The rotation processing unit 123 performs rotation processing on the image data acquired by the DMAC 122 according to the IJ recording head 108 and the positions of nozzles in the IJ recording head 108. The DMAC 122 outputs the image data having been subjected to the rotation processing to the IJ-recording-head control unit 127.

The rotation processing unit 123 acquires, for example, the rotation angle θ calculated by the position calculation unit 112 when the position calculation unit 112 calculates the position of the handheld printer 10, and performs rotation processing on the peripheral image using the rotation angle θ. Note that the rotation angle θ used here is an angle at which, when staring an image formation output, the handheld printer 10 is inclined on the plane of the sheet 30 with respect to the posture in which the handheld printer 10 performs the normal image formation on the sheet 30.

The interruption controller 124 detects that the navigation sensor I/F 125 has completed communication with the navigation sensor 105 and that the gyro sensor I/F 128 has completed communication with the gyro sensor 106. The interruption controller 124 outputs an interruption signal for notifying the SoC 110 of the completion of the communication. The CPU 111 acquires the moving amount of the navigation sensor 105 stored in an internal register of the navigation sensor I/F 125 based on the interruption signal. The interruption controller 124 also has a function of notifying a status such as an error.

The navigation sensor I/F 125 communicates with the navigation sensor 105, receives a movement amount as information from the navigation sensor 105, and stores the value in an internal register.

The printing-and-sensor timing generation unit 126 notifies the navigation sensor I/F 125 of the timing at which the detection signal of the navigation sensor 105 is read, and also notifies the IJ-recording-head control unit 127 of the drive timing. When the IJ-recording-head control unit 127 determines that the nozzle position has reached the target discharge position at which ink should be discharged, the IJ-recording-head control unit 127 causes the IJ-recording-head drive circuit 107 to discharge ink onto the sheet 30.

The IJ-recording-head control unit 127 discharges ink if the nozzle orifice 1081 (nozzle group 180) is at a target discharge position at which ink should be discharged, based on the nozzle array setting of the nozzle group 180 in the nozzle array setting unit 130. If there is no target discharge position, the IJ-recording-head control unit 127 controls the IJ-recording-head drive circuit 107 not to discharge ink.

The gyro sensor I/F 128 acquires the angular velocity detected by the gyro sensor 106 based on the timing generated by the printing-and-sensor timing generation unit 126 and stores the value of the angular velocity in a register.

The communication control unit 129 detects the image data transmitting device 20 connected to the communication I/F 109 and notifies the determination processing unit 113 of the connection state. Further, the communication control unit 129 controls communication with the image data transmitting device 20 connected to the communication I/F 109. Therefore, the communication control unit 129 constitutes a result output unit to output determination result information including a determination result to the image data transmitting device 20.

The nozzle array setting unit 130 sets any one of the first nozzle array 181 and the second nozzle array 182 as the "nozzle array to be used" in the nozzle group 180 included in the IJ recording head 108 and stores the setting information in the register. The information on the "nozzle array to be used" stored in the nozzle array setting unit 130 is determined based on the print mode set from the OPU 104 via the operation input I/F 131 and the usage history of the nozzle group 180. The nozzle array setting unit 130 constitutes an image forming array setting unit.

The operation input I/F 131 receives control information such as a print mode setting input from the OPU 104 and a trigger for starting an image forming operation (pressing of the operation button 15) and notifies the CPU 111 of the control information.

Functional Configuration of Determination Processing Unit 113

Figure 5:
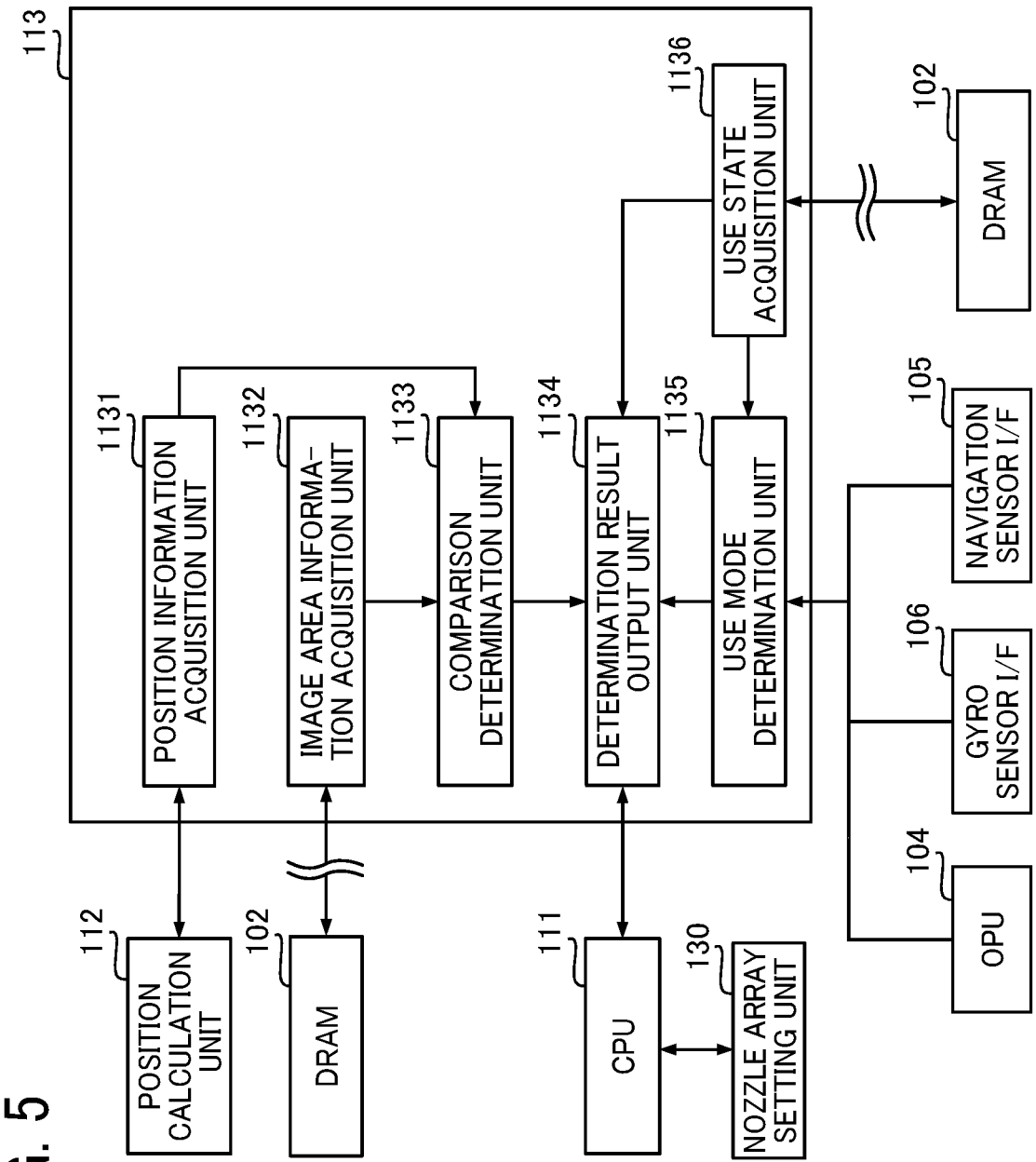
FIG. 5 is a block diagram illustrating a functional configuration of the handheld printer.

Next, a detailed configuration of the determination processing unit 113 according to the present embodiment is described with reference to FIG. 5. FIG. 5 is a functional block diagram of an internal configuration of the determination processing unit 113. The determination processing unit 113 includes a position information acquisition unit 1131, an image area information acquisition unit 1132, a comparison determination unit 1133, a determination result output unit 1134, a use mode determination unit 1135, and a use state acquisition unit 1136.

The position information acquisition unit 1131 acquires information on the position of the handheld printer 10 calculated by the position calculation unit 112. The position information acquisition unit 1131 may acquire information on the positions of the nozzles arrayed on the IJ recording head 108.

The image area information acquisition unit 1132 acquires, from a storage medium such as the DRAM 102, image area information indicating an area on the sheet 30 in which the image data selected by the user U as a target of an image forming output by the handheld printer 10 is formed. The image area information is transmitted from the image data transmitting device 20 to the handheld printer 10 and stored in the storage medium such as the DRAM 102.

The comparison determination unit 1133 determines whether the current scanning position of the handheld printer 10 is within the image area based on the information on the position of the handheld printer 10 and the image area information acquired by the position information acquisition unit 1131.

The determination result output unit 1134 outputs to the CPU 111 the result of the determination by the comparison determination unit 1133 as to whether the current scanning position of the handheld printer 10 is within the image area.

The determination result output unit 1134 determines the nozzle array to be used in the nozzle group 180 based on the determination result of the print mode setting by the use mode determination unit 1135 and the determination result of the scanning direction, and notifies the CPU 111 of the determination result.

The determination result output unit 1134 determines which one is more appropriate as the nozzle array to be used based on the use history information acquired from the DRAM 102 by the use state acquisition unit 1136, and notifies the CPU 111 of the determination result.

Note that the use history information includes information indicating the frequency of use such as the number of times of discharge operation and the cumulative use time in each group (nozzle array) constituting the nozzle group 180 in the handheld printer 10. The use history information includes information that may cause aging in a configuration that affects the quality of print processing in the handheld printer 10. By determining the nozzle array to be used based on such information, the handheld printer 10 can adjust the state of the plurality of nozzle arrays to be equal. Therefore, the use state acquisition unit 1136 and the determination result output unit 1134 constitute a maintenance-and-recovery operation control unit that controls the execution of the maintenance and recovery operation for the nozzle orifices 1081. In addition, control is performed such that a pattern image 500 described later is switched according to the degree (length) of the cumulative use time included in the use history information.

The use mode determination unit 1135 determines which one of the plurality of nozzle arrays included in the nozzle group 180 is preferably used, based on the scanning direction that can be determined based on the information from the navigation sensor 105 acquired via the navigation sensor I/F 125. The use mode determination unit 1135 determines which of the plurality of nozzle arrays included in the nozzle group 180 is preferably used, based on the scanning direction that can be determined based on the information from the gyro sensor 106 acquired via the gyro sensor I/F 128. The use mode determination unit 1135 determines which one of the plurality of nozzle arrays included in the nozzle group 180 is preferably used, based on the scanning direction that can be determined based on the information from the OPU 104 acquired via the operation input I/F 131. The use mode determination unit 1135 notifies the determination result output unit 1134 of the determination result.

The OPU 104, the gyro sensor 106, the navigation sensor 105, the use mode determination unit 1135, and the determination result output unit 1134 constitute a scan mode setting unit that sets a scan mode according to the use mode of the handheld printer 10 used by the user U.

The use state acquisition unit 1136 acquires the use history information stored in the DRAM 102 and notifies the determination result output unit 1134 of the use history information. The DRAM 102 constitutes the use state storage unit.

The CPU 111 notifies the user U of the current scanning position of the handheld printer 10 (out-of-image-area notification) based on the result of the determination whether the current scanning position of the handheld printer 10 is within the image area received from the determination result output unit 1134.

The CPU 111 causes an application developed in the DRAM 102 to generate notification information for the out-of-image-area notification and notification information based on the connection state and transmit the generated notification information to the image data transmitting device 20. When receiving the notification information, the image data transmitting device 20 performs the out-of-image-area notification through display of character information such as "out of the area in which an image is printed" or voice guidance.

The CPU 111 notifies the nozzle array setting unit 130 of the determination result information notified from the determination result output unit 1134. The nozzle array setting unit 130 sets the nozzle array to be used based on the notification from the CPU 111 and notifies the IJ-recording-head control unit 127 of the nozzle array to be used.

Hardware Configuration of Image Data Transmitting Device 20

Figure 6:
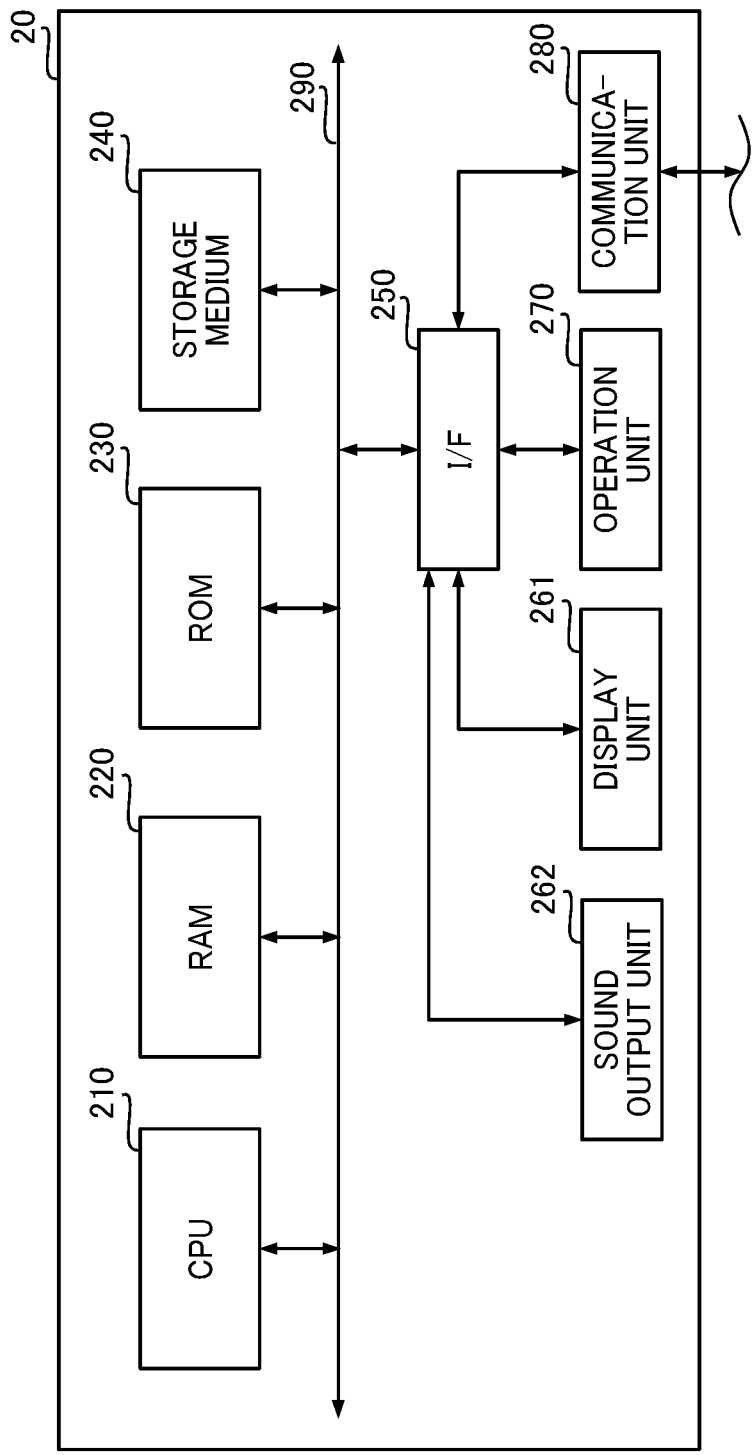
FIG. 6 is a block diagram of an example of a hardware configuration of an image data output device according to an embodiment of the present disclosure.

Next, a brief description is given of an image data transmitting device 20, which is an embodiment of an external device that inputs image data to the handheld printer 10. FIG. 6 depicts a hardware configuration of the image data transmitting device 20. The image data transmitting device 20 according to the present embodiment has the same configuration as an information processing device such as a general PC. That is, in the image data transmitting device 20 according to the present embodiment, the CPU 210, the RAM 220, the ROM 230, the storage medium 240 such as a HDD (Hard Disk Drive), and the I/F 250 are connected via the bus 290.

Further, in addition to the above configuration, the image data transmitting device 20 includes a display unit 261 such as an LCD (Liquid Crystal Display), an operation unit 270 such as a keyboard, a wired connection such as a LAN, an NFC, a wireless LAN, and the like via an I/F 250. The communication unit 280 is configured to communicate with the handheld printer 10 and other information processing terminals by wireless connection and to be connected. A sound output unit 262 to output sound is also connected via the I/F 250.

The CPU 210 is an arithmetic unit and controls the operation of the entire image data transmitting device 20. The RAM 220 is a volatile storage medium capable of reading and writing information at high speed and is used as a work area (working memory) when the CPU 210 processes information. The ROM 230 is a read-only nonvolatile storage medium and stores programs such as firmware.

The storage medium 240 is a nonvolatile storage medium, such as an HDD and a solid state drive (SSD), on which information can be read and written, and stores an operating system (OS), various control programs, application programs (hereinafter, applications), and the like. The I/F 250 connects the bus 290 to various hardware, such as the display unit 261, the operation unit 270, and the sound output unit 262, and a network and the like via the communication unit 280 to control such various hardware and the network.

The display unit 261 is a user I/F for the user U to check the state of the image data transmitting device 20 received via the I/F 250. The operation unit 270 is a user I/F for a user U to input information to the image data transmitting device 20. Note that the display unit 261 and the operation unit 270 may be a touch panel using a resistance film system, a surface acoustic wave system, a capacitance system, or the like as an operation principle system.

The sound output unit 262 notifies the user U of the state of the handheld printer 10 as a sound based on the determination result information notified from the handheld printer 10.

Figure 7:
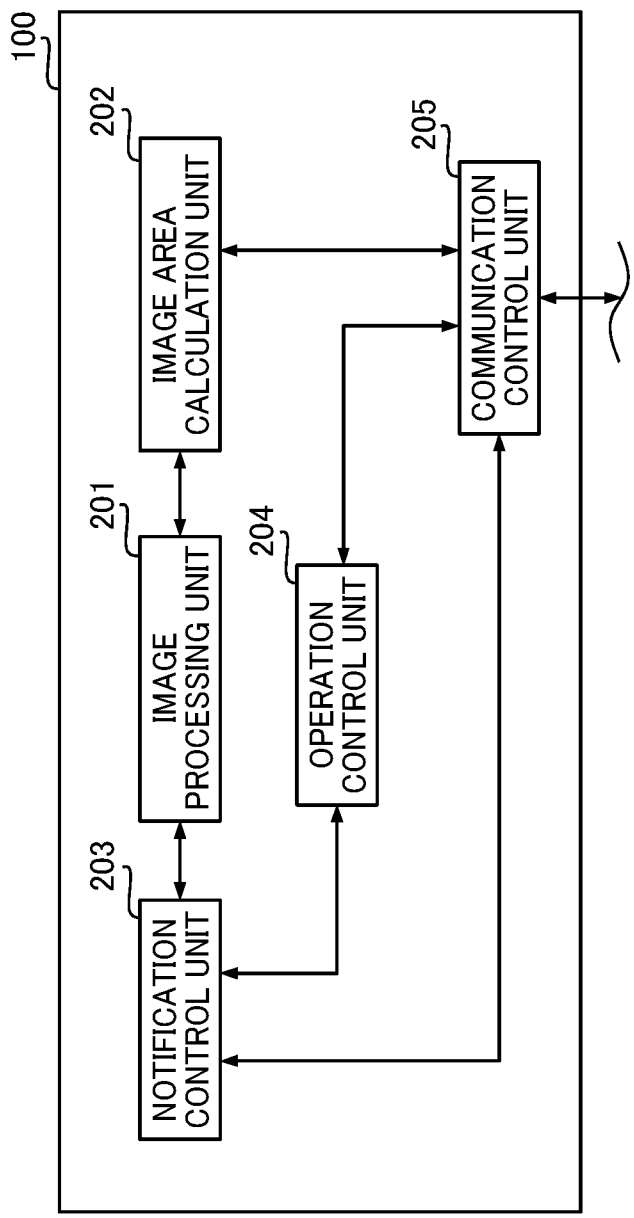
FIG. 7 is a block diagram of a functional configuration of the image data output device.

In such a hardware configuration, the internal functions of the controller 200 illustrated in FIG. 7 are configured by the CPU 210 performing operations according to programs stored in the ROM 230 or programs read from the storage medium 240 onto the RAM 220. A combination of the internal functions of the controller 200 and the hardware constitutes functional blocks for realizing the functions of the image data transmitting device 20.

Functional Block of Controller 200

Next, a description is given of an internal function of the controller 200 of the image data transmitting device 20. FIG. 7 is a functional block diagram illustrating a configuration of internal functions of the controller 200 according to the present embodiment.

The controller 200 includes an image processing unit 201, an image area calculation unit 202, a notification control unit 203, an operation control unit 204, and a communication control unit 205. The image processing unit 201 performs a process of converting image data selected by the user U as a target of image formation output by the handheld printer 10 into a format that can be output by the handheld printer 10.

The image processing unit 201 applies a condition set by the user U on the image formation output, for example, a condition such as monochrome or color printing, enlargement or reduction, or the like to perform the processing of converting the image data into the format that can be output by the handheld printer 10.

The image area calculation unit 202 calculates an area in which the image data selected by the user U as an object of image formation output of the handheld printer 10 is formed, based on the image data processed by the image processing unit 201, to generate image area information. Note that a configuration may be employed in which the user U designates and determines the area in which image data is formed to generate the image area information.

The notification control unit 203 controls a screen displayed on the display unit 261. For example, when receiving the out-of-image-area notification information from the handheld printer 10, the notification control unit 203 causes the display unit 261 to display a screen based on the out-of-image-area notification information.

When receiving initialization completion notification from the handheld printer 10, the notification control unit 203 causes the display unit 261 to display a screen based on the initialization completion notification. In such a case, the notification control unit 203 may output a sound indicating the completion of the initialization of the handheld printer 10 via the sound output unit 262.

The operation control unit 204 generates control information based on the operation of the operation unit 270 by the user U and transmits the control information to each unit of the controller 200. The communication control unit 205 controls communication with the handheld printer 10 and controls transmission and reception of information with the handheld printer 10.

With the above-described configuration, the image forming system 1000 according to the present embodiment executes the image formation output on the sheet 30 using the handheld printer 10 based on the image data received from the image data transmitting device 20.

Embodiment of Image Forming Output Operation

Figure 8:
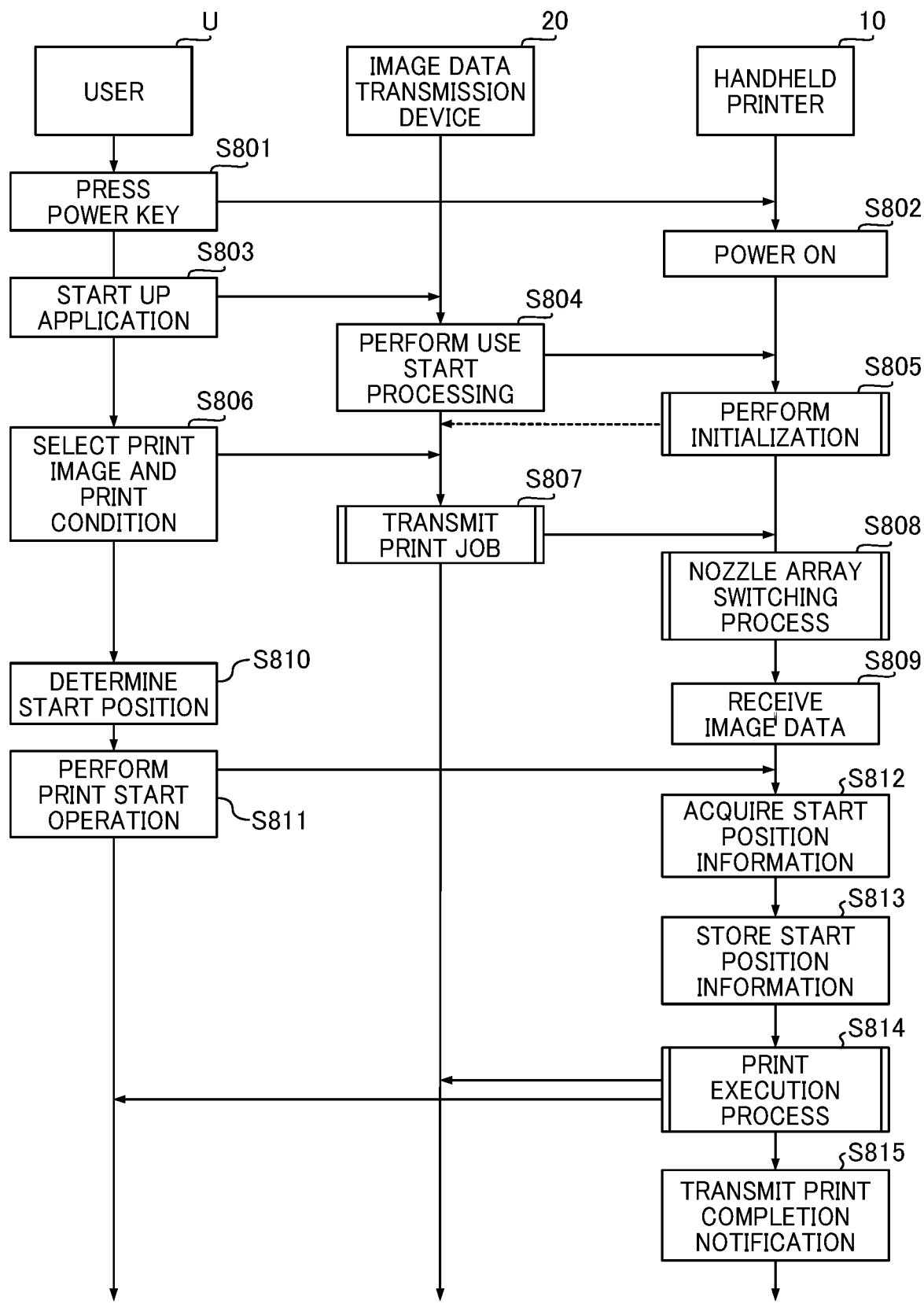
FIG. 8 is a sequence diagram of a flow of an image forming process by the handheld printer and the image data output device.

Next, the flow of processing in a control program according to an embodiment of the present disclosure is described with reference to an example of an image forming output operation using the handheld printer 10. FIG. 8 is a sequence diagram of an operation procedure from start-up to completion of image formation of the handheld printer 10 according to the present embodiment.

In the process of FIG. 8, the processing for which the CPU 111 is described as an execution subject is processing achieved by functions that become available by the CPU 111 executing firmware or the like.

When the user U presses the power switch of the handheld printer 10 (S801), the handheld printer 10 starts power supply from the power supply 141 (S802). Thus, the initialization process (S805) is performed. In the initialization process (S805), the CPU 111 executes a process for initializing electronic devices constituting the handheld printer 10, for example, components such as the ASIC/FPGA 120.

The user U causes the image data transmitting device 20 to execute an application for causing the handheld printer 10 to execute an image forming operation as a specific processing operation (S803). In FIG. 8, the application is started (S803) after the power button is pressed on the handheld printer 10 (S801). Note that the order of operation and processing is not limited to the above-described order and may be reversed.

The image data transmitting device 20 starts a predetermined application in the step of starting up the application (S803), starts communication with the handheld printer 10, and executes use start processing (S804). The use start processing (S804) is processing of establishing a communication state between the image data transmitting device 20 and the handheld printer 10 so that communication processing with the handheld printer 10 can be performed. The use start processing (S804) includes processing of receiving information indicating the state of the handheld printer 10.

After starting up the application in the image data transmitting device 20, the user U selects, on the application, an image (print image) for which print processing is requested using the application and a print mode for printing the image (S806). In the present embodiment, it is assumed that the use start processing (S804) is performed before the initialization process (S805) of the handheld printer 10 is completed, and a print image selection processing (S806) is performed after the initialization process (S805). The timing at which the initialization process (S805) is completed is not limited to the timing illustrated in FIG. 8. For example, the print image selection (S806) may be able to be executed in the image data transmitting device 20 even while the initialization process (S805) is being performed.

If the user U can perform the print image selection process (S806), print job transmission (S807) cannot be executed unless the handheld printer 10 finishes the initialization process (S805) and is in a state in which the print processing is permitted (operation permitted state).

When the user U performs an operation for printing of the image selected in S806, the image data transmitting device 20 generates a print job and image area information and transmits the print job and the image area information to the handheld printer 10 (S807).

Note that, when the user U performs the operation for printing the image selected in S806, the application installed in the image data transmitting device 20 calls a printer driver, converts the printing conditions and the image data in a predetermined format, and send the printing conditions and the image data to the handheld printer 10. Note that image data in a format of TIFF, JPEG, or the like may be transmitted to the handheld printer 10 without changing the format with a printer driver.

The image area calculation unit 202 generates image area information using the upper left end of the image data selected as an image to be formed by the user U as an origin. The image area calculation unit 202 may also generate the image area information with a margin around the area in which the image is actually formed, in consideration of the width of the body of the handheld printer 10 and the like.

When the transmission of the print job to the handheld printer 10 is started (S807), the CPU 111 simultaneously receives the setting of the print mode including the received print job and the use history information indicating the use state. Then, a nozzle array switching process based on the print mode and the use history is executed (S808).

When the transmission of the print job to the handheld printer 10 is started (S807), the CPU 111 notifies the user U that the print job is being received (reception of the print job is not completed), for example, by blinking the LED switch (S809).

In the flow of FIG. 8, after the print job transmission (S807), the nozzle array switching process (S808) is executed before image data reception (S809) is executed. However, the execution of S808 and S809 may be reversed in order. The nozzle array switching process (S808) may be performed after the print job transmission (S807) and before the print execution process (S814) is started. Details of the nozzle array switching process (S808) are described later.

When the reception of the image data is completed, the CPU 111 notifies the user U of the completion of the reception of the image data by, for example, changing the blinking of the LED switch to the lighting. The CPU 111 transfers the received image data to the DMAC 122.

When the OPU 104 has a sound generation mechanism, the image data reception notification and the image data reception completion notification may be performed by voice.

The user U determines the initial position of the handheld printer 10 on the sheet 30, that is, the start position of image formation while receiving the image data in the handheld printer 10 (S810).

The user U determines the initial position by, for example, an operation of placing the handheld printer 10 at an arbitrary position on the sheet 30. After determining the initial position, the user U places the handheld printer 10 at an arbitrary position on the sheet 30 as an expected start position of image formation output, and performs a print start operation of pressing the LED switch (S811). The operation of S811 acts as a trigger for starting the printing operation for the handheld printer 10.

Subsequently, the handheld printer 10 performs an operation start determination process (S812). The CPU 111 accepts a key interrupt by the LED switch and causes the navigation sensor 105 to detect the position of the handheld printer 10 via the navigation sensor I/F 125 (S813). The initial position of the handheld printer 10 on the sheet 30 detected by the navigation sensor 105 in the processing of S813 is the position of the handheld printer 10 at the start of image formation, that is, the start position of image formation by the handheld printer 10.

Information on the start position detected by the navigation sensor 105 is stored in a storage medium such as the DRAM 102 as start position information of the handheld printer 10 (S814).

As described above, the distance from the navigation sensor 105 to the end of the IJ recording head 108, the distance from a nozzle at the position closest to the end of the IJ recording head 108 and the end of the IJ recording head 108, and the distance between the nozzles arranged in the IJ recording head 108 are stored in advance in a storage medium such as the ROM 103.

Therefore, the position calculation unit 112 can calculate the positions of the IJ recording head 108 and the nozzles arranged in the IJ recording head 108 based on the position information of the handheld printer 10.

Based on the detection result of the navigation sensor 105 acquired in S813, the position calculation unit 112 may calculate the positions of the IJ recording head 108 and the nozzles arranged in the IJ recording head 108.

Further, the result calculated by the position calculation unit 112 may be stored in a storage medium such as the DRAM 102 as start position information on the positions of the IJ recording head 108 and the nozzles arranged in the IJ recording head 108 at the start of image formation output.

The start position of the handheld printer 10 detected by the navigation sensor 105 may be stored as, for example, the coordinates (0, 0) in the DRAM 102 or the like. After storing the start position, the CPU 111 starts a print execution process (S814). Details of the print execution process are described later.

When determining that the processing of S815 has been completed, the CPU 111 transmits a print completion notification to the image data transmitting device 20. The CPU 111 notifies the user U that the printing of the image data has been completed, for example, by turning off the LED switch (S815).

Note that, for the handheld printer 10 according to the present embodiment, the user U cannot recognize whether the handheld printer 10 is scanning an image area in which image data is formed on the sheet 30 during execution of image formation output on the sheet 30. Here, the handheld printer 10 also has a function of notifying the user U of the state of the positional relationship between the current position and the image area.

Detailed Flow of Nozzle Array Switching (S808)

Figure 9:
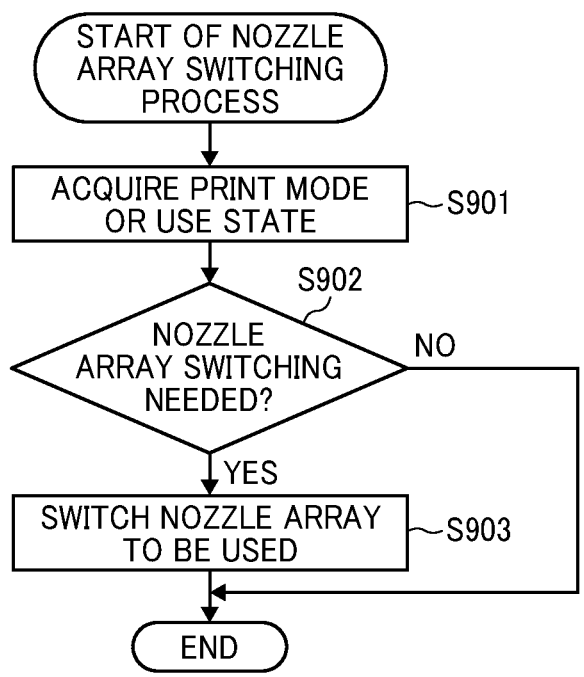
FIG. 9 is a flowchart illustrating a flow of a nozzle array switching process to executed in the handheld printer.

The details of the nozzle array switching process in S808 is described with reference to the flowchart in FIG. 9. When a print job is transmitted from the image data transmitting device 20 to the handheld printer 10 by the processing of S807, the handheld printer 10 first acquires a print mode or a use state (included in the use history information) (S901).

Subsequently, it is determined whether switching from the currently-set nozzle array to be used is necessary based on the print mode or use state (S902). If the nozzle array switching is not necessary (NO in S902), the process ends.

If the nozzle array switching is necessary (YES in S902), the nozzle array to be used is switched (S903) and the process ends.

Figure 11A:
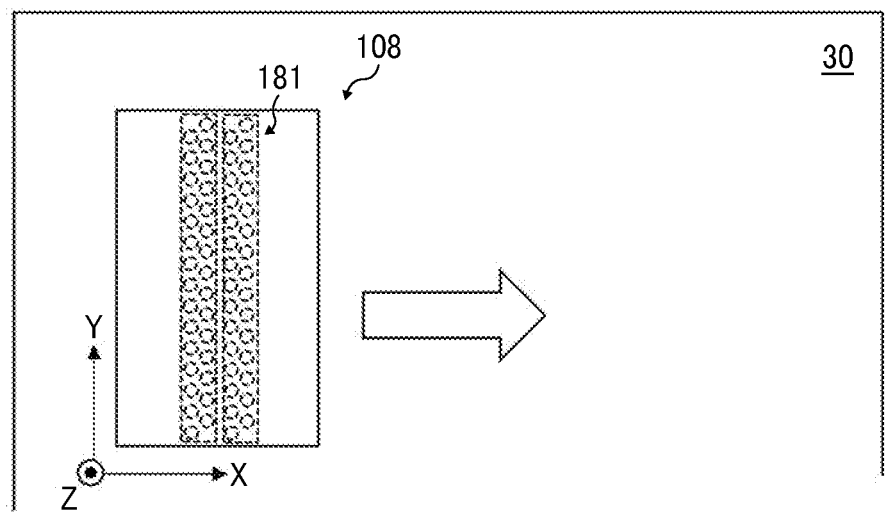
FIGS. 11A to 11C are schematic views of examples of the relationship between print mode and nozzle array to be used in the handheld printer.
Figure 11B:
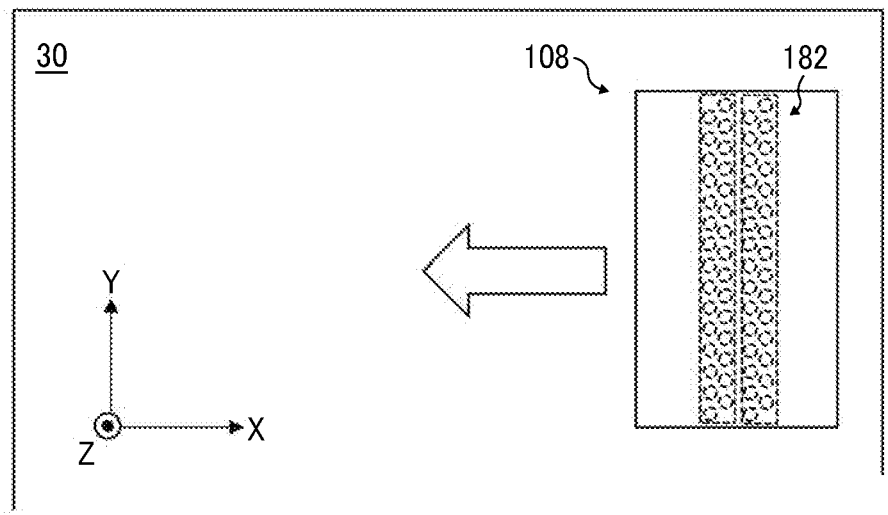
Figure 11C:
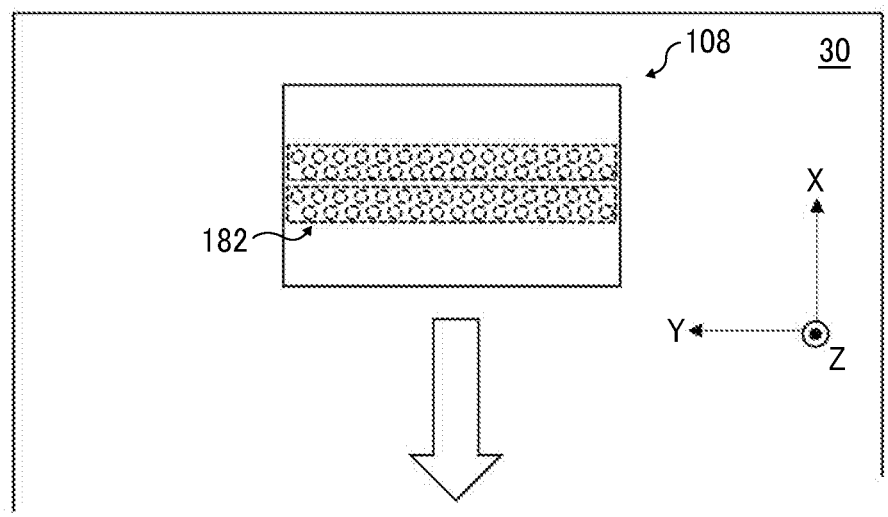

Here, the setting and switching of the nozzle array are described in more detail. FIGS. 11A to 11C illustrate the relationship between the moving direction of the IJ recording head 108 and the nozzle array when the user U performs an image forming operation using the handheld printer 10, that is, when the user U performs manual scanning.

FIG. 11A illustrates an example in which the print mode is "horizontal writing." When the print mode is "horizontal writing," the handheld printer 10 is scanned in the +X direction. In other words, an image is formed by "scanning to the right". In the case of the "single-pass mode" described later, an image is formed by repeating the scanning illustrated in FIG. 11A. In the case of the print mode illustrated in FIG. 11A, the nozzle array to be used is the first nozzle array 181.

FIG. 11B illustrates another example in which the print mode is "horizontal writing". In this case, the handheld printer 10 is scanned in the −X direction. In other words, an image is formed by "scanning to the left". When the dominant arm of the user U is the left arm, the scanning from right to left in this way may contribute to improvement in operability. In the case of the "N-pass mode" described later, an image is formed by alternately repeating the scanning illustrated in FIG. 11A and the scanning illustrated in FIG. 11B. In the case of the print mode illustrated in FIG. 11B, the nozzle array to be used is the second nozzle array 182.

FIG. 11C illustrates still another example in which the print mode is "vertical writing". In this case, the handheld printer 10 is rotated counterclockwise by 90° about the Z axis from the state of FIG. 11B and is scanned in the −X direction. In other words, an image is formed by "scanning from top to bottom". In this case, the scanning is performed in the −X direction and the nozzle array to be used is the second nozzle array 182.

As described above, the scanning direction of the handheld printer 10 differs depending on the print mode. The nozzle array on the front side in the scanning direction is set as the nozzle array to be used. Therefore, when the setting of the nozzle array to be used at the time of determination (S902) based on the print mode acquired in S901 is different from the setting corresponding to the print mode, the nozzle array to be used is switched.

This is because, in a case in which the nozzle array on the front side in the scanning direction is set as the nozzle array to be used, the image disturbance due to scanning is highly likely to be absorbed even if the direction of droplets discharged from the discharge port is inclined. More specifically, in the case in which a nozzle array in a direction different from the scanning direction is set as the nozzle array to be used, the discharge intervals of the droplets are widened at the start of scanning if the direction of droplets discharged from the nozzle orifice is inclined to the opposite side to the scanning direction. Accordingly, the printing result is likely to be blurred. By contrast, in the case in which the nozzle array arranged in the same direction as the scanning direction is set as the nozzle array to be used, the discharge intervals of the droplets can be filled by the next discharge even if the discharge direction of droplets particularly at the start of scanning is inclined in the opposite direction to the scanning direction. Accordingly, the print result is unlikely to be blurred.

Therefore, the handheld printer 10 according to the present embodiment sets the nozzle array arranged on the front side in the normal scanning direction as the nozzle array to be used in the set print mode. As a result, the influence on the printed image due to the inclination of the discharge direction at the beginning of the execution of the printing process can be reduced.

Detailed Flow of Print Execution Process (S814)

Figure 12:
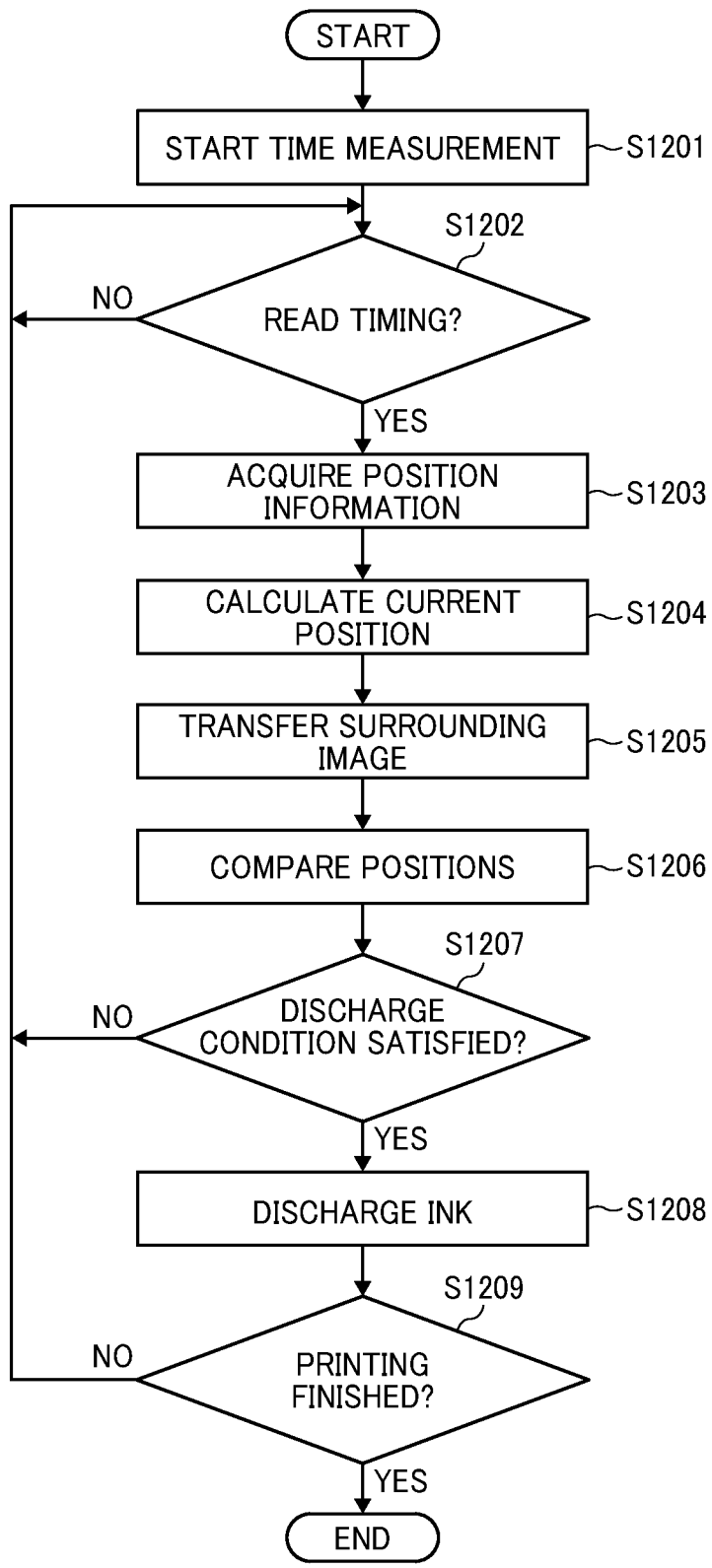
FIG. 12 is a flowchart of a detailed flow of the image forming process by the handheld printer.

The details of the print execution process of S814 are described with reference to the flowchart of FIG. 12. When the start position information of the handheld printer 10 is stored in the storage medium by the processing in S814, the CPU 111 causes the printing-and-sensor timing generation unit 126 to start time measurement (S1201). In S1201, the position of the IJ recording head 108 and the respective positions of the nozzles on the IJ recording head 108 may be stored as the start position information of the handheld printer 10.

Subsequently, at a preset read timing for the navigation sensor 105 (YES in S1202), the navigation sensor I/F 125 causes the navigation sensor 105 to detect the amount of movement of the handheld printer 10 (S1203).

The CPU 111 acquires the detection result of the navigation sensor 105 from the ASIC/FPGA 120 and causes the position calculation unit 112 to calculate the current position P1 of the handheld printer 10 (S1204). In the processing of S1204, the position calculation unit 112 determines the current position P1 (X1, Y1) of the handheld printer 10 based on the position P (X, Y) of the handheld printer 10 calculated last time and the movement amount AP (ΔX, ΔY) of the handheld printer 10 acquired this time and stores the calculated current position P1 (X1, Y1) in the DRAM 102.

Subsequently, the CPU 111 transfers the information on the calculated current position P1 (X1, Y1) of the handheld printer 10 to the ASIC/FPGA 120. Note that, based on the position information of the handheld printer 10, the position calculation unit 112 calculates the positions of the IJ recording head 108 and the nozzles arranged in the IJ recording head 108, and the CPU 111 may transfer the calculation result to the ASIC/FPGA 120 as the current position P1 of the IJ recording head 108 and each of the nozzles arranged in the IJ recording head 108.

The DMAC 122 acquires image data around the nozzles arranged in the IJ recording head 108 from the DRAM 102 based on the position information of the current position P1 (X1, Y1) of the handheld printer 10 and temporarily stores the image data in the image RAM 121.

The rotation processing unit 123 acquires image data around the nozzles from the image RAM 121 based on the current position P1 (X1, Y1) of the handheld printer 10 and performs rotation processing on the acquired image data around the nozzles. (S1205).

The DMAC 122 deletes, from the DRAM 102, the image data around the nozzles acquired from the DRAM 102. The IJ-recording-head control unit 127 compares the coordinates of the rotated image data with the coordinates of the nozzle position determined based on the current position P1 (X1, Y1) of the handheld printer 10 (S1206).

When it is determined that the preset ink discharge condition is satisfied, that is, the nozzle position has reached the target discharge position that is determined as a position on which ink is to be discharged based on the image data or the deviation between the nozzle position and the target discharge position is within an allowable error (YES in S1207), the IJ-recording-head control unit 127 inputs the image data around the nozzles of the IJ recording head 108 to the IJ-recording-head drive circuit 107 that is rotated in the processing of S1205.

The IJ-recording-head drive circuit 107 causes the IJ recording head 108 to discharge ink to the sheet 30 based on the input image data (S1208). Until all image data as the object of image formation output stored in the DRAM 102 is transferred to the DMAC 122 or until a signal for ending the image formation output is received by, e.g., operation of the user U on the LED switch (NO in S1209), the processing steps from S1202 to S1209 are repeatedly executed to form an image on the sheet 30.

In S1208, ink is discharged, and all the image data as the object of image formation output stored in the DRAM 102 has been transferred to the DMAC 122 or the signal (printing operation end trigger) for ending the image formation output has been received by, e.g., the operation of the user U on the LED, the CPU 111 determines that the image formation output has ended (YES in S1209).

As described above, the handheld printer 10 according to the present embodiment determines whether the handheld printer 10 is in a state suitable for performing an image forming operation. When the handheld printer 10 is not in the state suitable for performing the image forming operation, the handheld printer 10 causes the image data transmitting device 20 to restrict the transmission of image data. More specifically, a user I/F for the user U is controlled so that image data cannot be transmitted.

Even if the image data is received and an operation start trigger for instructing the start of the image forming operation is received, control is performed so that the operation is not executed until the handheld printer 10 is in the state suitable for the image forming operation. Such a configuration can prevent the occurrence of a behavior unintended by the user U.

Maintenance Mode

The handheld printer 10 according to the present embodiment includes a "maintenance mode" as one of the print modes. The maintenance mode is a type of recovery process for recovering the state of the nozzles of the IJ recording head 108. The maintenance mode is a process for printing, on the sheet 30, not the image data selected by the user U but the "pattern image 500" for the user U to check the state of the nozzles. If the user U selects the "maintenance mode" in the processing of S806 described above, a print job for the maintenance mode is generated and transmitted to the handheld printer 10 in the subsequent S807.

When receiving the print job for the maintenance mode, the handheld printer 10 acquires the information indicating the execution request of the "maintenance mode" in S901 described above and performs the process of forming the predetermined "pattern image 500" based on the information.

Embodiments of Pattern Image

Figure 13:
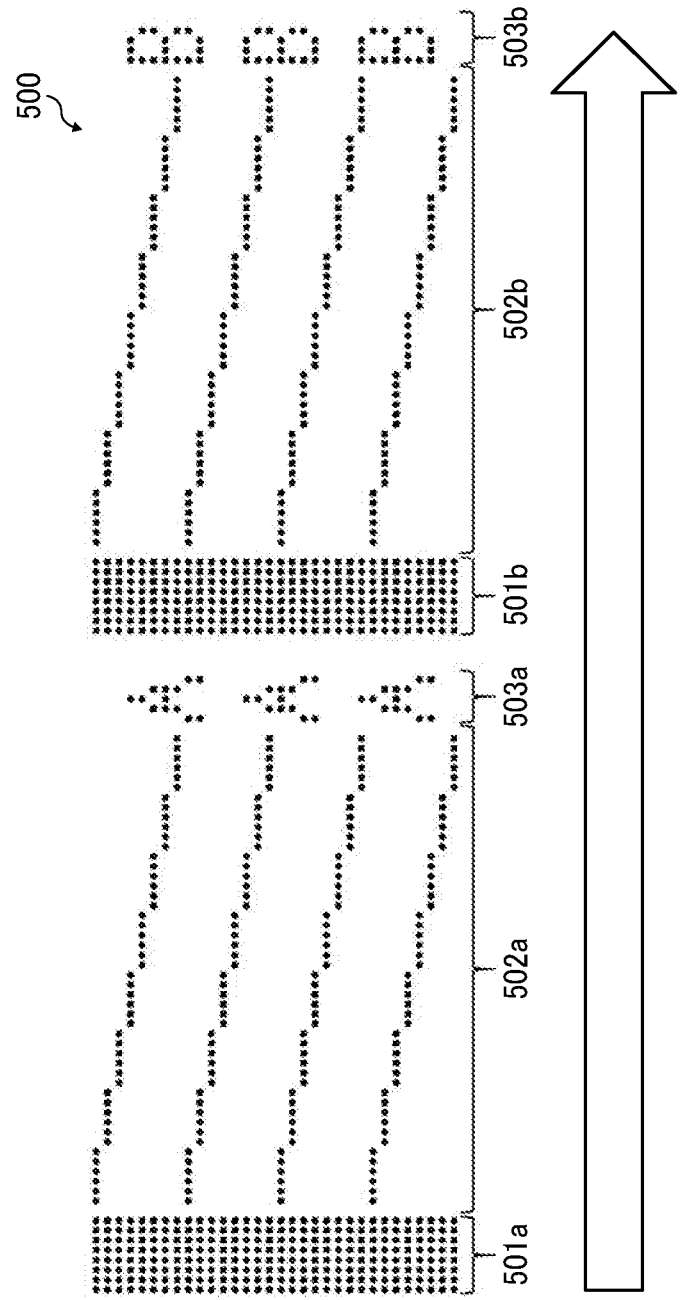
FIG. 13 is an illustration of an example of a pattern image used in a maintenance mode of the handheld printer.

Examples of the pattern image 500 that can be used in the maintenance mode by the handheld printer 10 according to the present embodiment are described with reference to FIGS. 13 to 16. As illustrated in FIG. 13, the pattern image 500 has a configuration including recovery patterns 501a and 501b (collectively referred to as recovery patterns 501 unless distinguished), confirmation patterns 502a and 502b (collectively referred to as confirmation patterns 502 unless distinguished), and identification patterns 503a and 503b (collectively referred to as identification patterns 503 unless distinguished).

The recovery pattern 501 is an image pattern formed by discharging ink as a solid pattern from all nozzles of the IJ recording head 108 and is a pattern for resolving discharge failure and non-discharge of ink. The confirmation pattern 502 is a pattern printed by shifting the nozzles used for printing, among the nozzles arranged at certain intervals in the nozzle array of the IJ recording head 108, in the array direction of the nozzle array in accordance with the scanning of the handheld printer 10. The confirmation pattern 502 is a pattern for the user to visually confirm whether the discharge failure and non-discharge of ink have been actually resolved as a result of the printing of the recovery pattern 501. The identification pattern 503 is a pattern including information for specifying the nozzle array in which the recovery pattern 501 and the confirmation pattern 502 have been formed.

In the pattern image 500 according to the present embodiment, the IJ recording head 108 separately operates the first nozzle array 181 and the second nozzle array 182 to form the identification pattern 503 to facilitate identification of which of the first nozzle array 181 and the second nozzle array 182 is formed to form the identification pattern 503. Arrow illustrated in FIG. 13 indicates the scanning direction.

First, the first nozzle array 181 forms a first recovery pattern 501a to print the first recovery pattern 501a on the sheet 30. Subsequently, the first nozzle array 181 forms a first confirmation pattern 502a to print the first confirmation pattern 502a on the sheet 30. When the printing of the first confirmation pattern 502a is completed, the first nozzle array 181 forms the first identification pattern 503a following the first confirmation pattern 502a to print the first identification pattern 503a on the sheet 30. The first identification pattern 503a is printed as a pattern that can be recognized as, for example, a character "A" as information for identifying the first nozzle array 181 so that the user U can easily recognize which nozzle array is used to form the first identification pattern 503a.

After the pattern image 500 is printed by the first nozzle array 181 as described above, a slight space is provided after the first identification pattern 503a and a second recovery pattern 501b is printed by the second nozzle array 182. Similarly to the above-described process, the second confirmation pattern 502b and the second identification pattern 503b are subsequently printed by the second nozzle array 182. The second identification pattern 503b is printed as a pattern that can be recognized as the character "B" as information for identifying the second nozzle array 182.

The confirmation pattern 502 illustrated in FIG. 13 is formed in a stepwise manner as a result of shifting nozzles used for printing, among the nozzles arranged in the nozzle array, in the array direction of the nozzle array. However, the print pattern is not limited to the stepwise pattern and any print pattern can be used as long as the print for each nozzle can be distinguished. The width of each of the recovery pattern 501 and the confirmation pattern 502 in the direction orthogonal to the scanning direction (array direction of the nozzle array) corresponds to the width of the opening 16 illustrated in FIG. 1B in the direction orthogonal to the scanning direction.

Further, the respective widths of the recovery pattern 501 and the confirmation pattern 502 in the scanning direction and the arrangement of printing of each nozzle of the nozzle array in the confirmation pattern 502 may be changeable according to, for example, an operation input by the user.

The recovery pattern 501 is not necessarily printed as a solid pattern and may be any pattern that can resolve discharge failure and non-discharge of ink.

Figure 14:
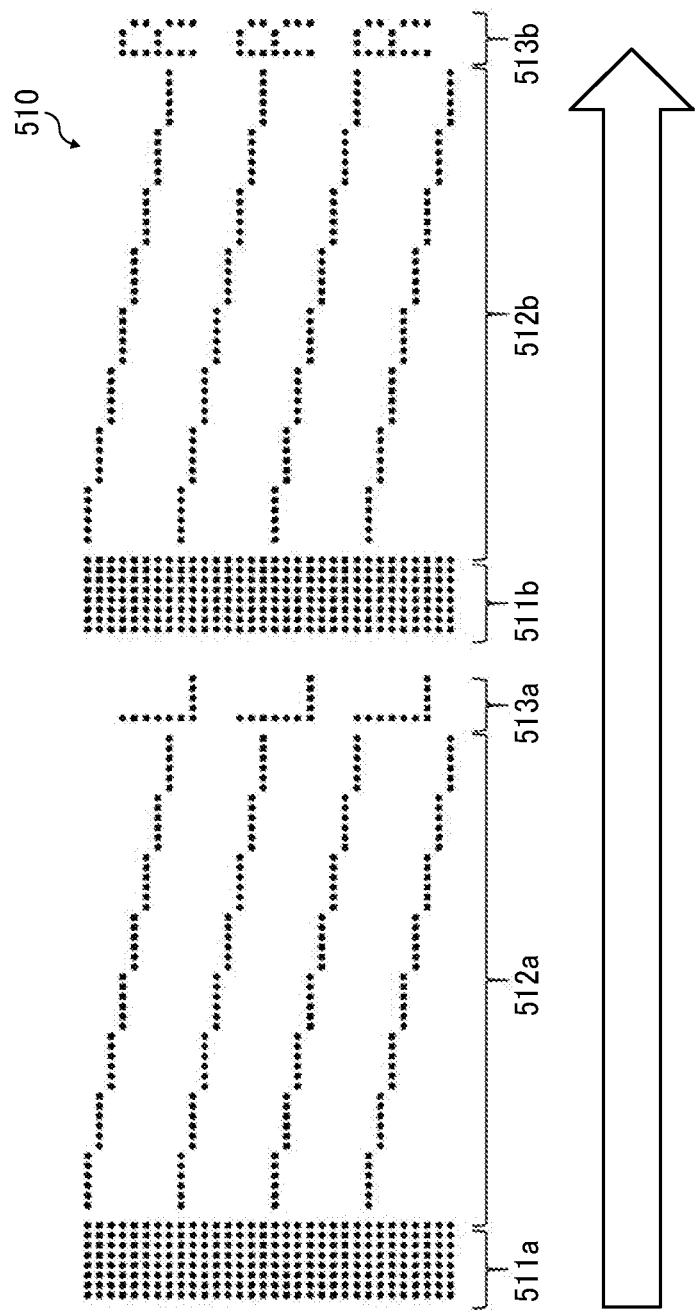
FIG. 14 is an illustration of another example of the pattern image used in the maintenance mode of the handheld printer.

FIG. 14 illustrates an example of a pattern image 510 that can be used in the maintenance mode. Arrow illustrated in FIG. 14 also indicates the scanning direction. The pattern image 510 has a configuration similar to the configuration of the pattern image 500 illustrated in FIG. 13 and includes recovery patterns 511a and 511b (collectively referred to as recovery patterns 511 unless distinguished), confirmation patterns 512 (collectively referred to as confirmation patterns 512 unless distinguished), and identification patterns 513 (collectively referred to as identification patterns 513 unless distinguished).

The recovery pattern 511 and the confirmation pattern 512 are the same as the recovery pattern 501 and the confirmation pattern 502 described above but the identification pattern 513 is different from the identification pattern 503.

The identification pattern 513 is a pattern including identification information for specifying the nozzle array to be used, in order for the user U to identify the nozzle array used to form the recovery pattern 511 and the confirmation pattern 512. Therefore, as illustrated in FIG. 14, assuming that the first nozzle array 181 is on the left side of the nozzle discharge surface of the IJ recording head 108, the identification pattern 513a imitating the character "L" implying the left side is printed as identification information, following the confirmation pattern 512a printed by the first nozzle array 181. Further, assuming that the second nozzle array 182 is on the right side of the nozzle discharge surface of the IJ recording head 108, the identification pattern 513b imitating the character "R" implying the right side is printed as identification information, following the confirmation pattern 512b printed by the second nozzle array 182.

FIG. 15 illustrates an example of a pattern image 520 that can be used in the maintenance mode. Arrow illustrated in FIG. 15 also indicates the scanning direction. The pattern image 520 has a different configuration from the configuration of each of the pattern image 500 and the pattern image 510 illustrated in FIGS. 13 and 14. The pattern image 520 includes recovery patterns 521a and 521b (collectively referred to as recovery patterns 521 unless distinguished) and confirmation patterns 522 (collectively referred to as confirmation patterns 522 unless distinguished).

The confirmation pattern 522 is similar to the confirmation pattern 502 and the confirmation pattern 512 described above. However, the recovery pattern 521 is different from the recovery pattern 501 and the recovery pattern 511.

The recovery pattern 521 also serves as an identification pattern. Each recovery pattern 521 imitates the character "L" or "R" that implies a nozzle array to be used.

Figure 16A:
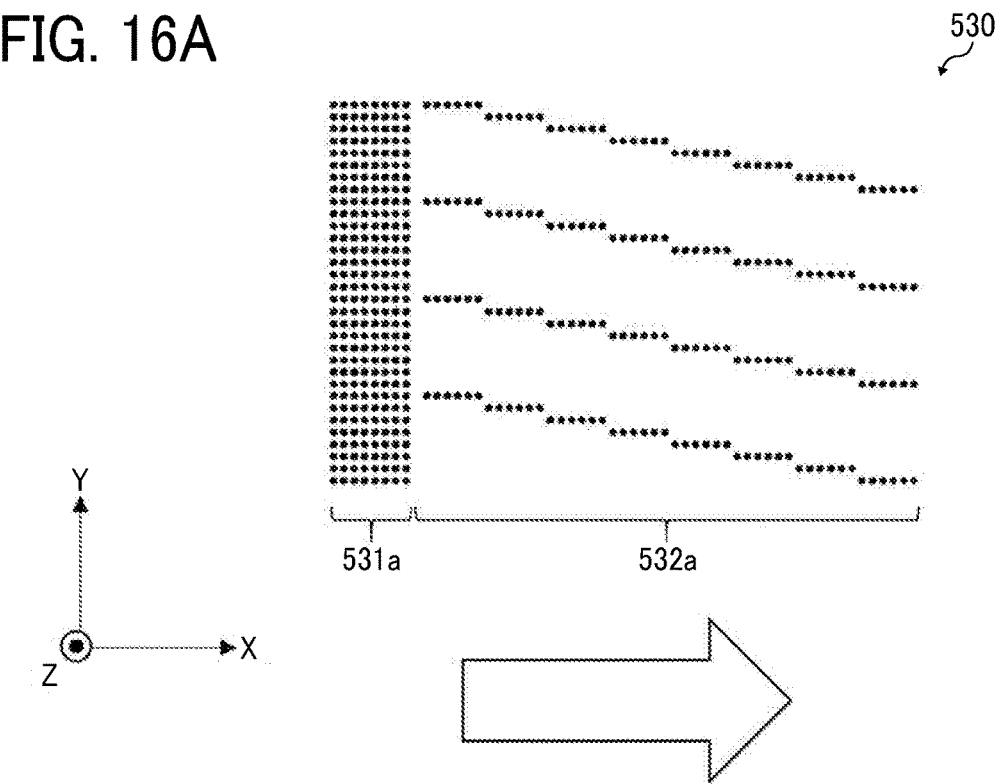
FIGS. 16A and 16B are illustrations of other examples of the pattern image used in the maintenance mode of the handheld printer.
Figure 16B:
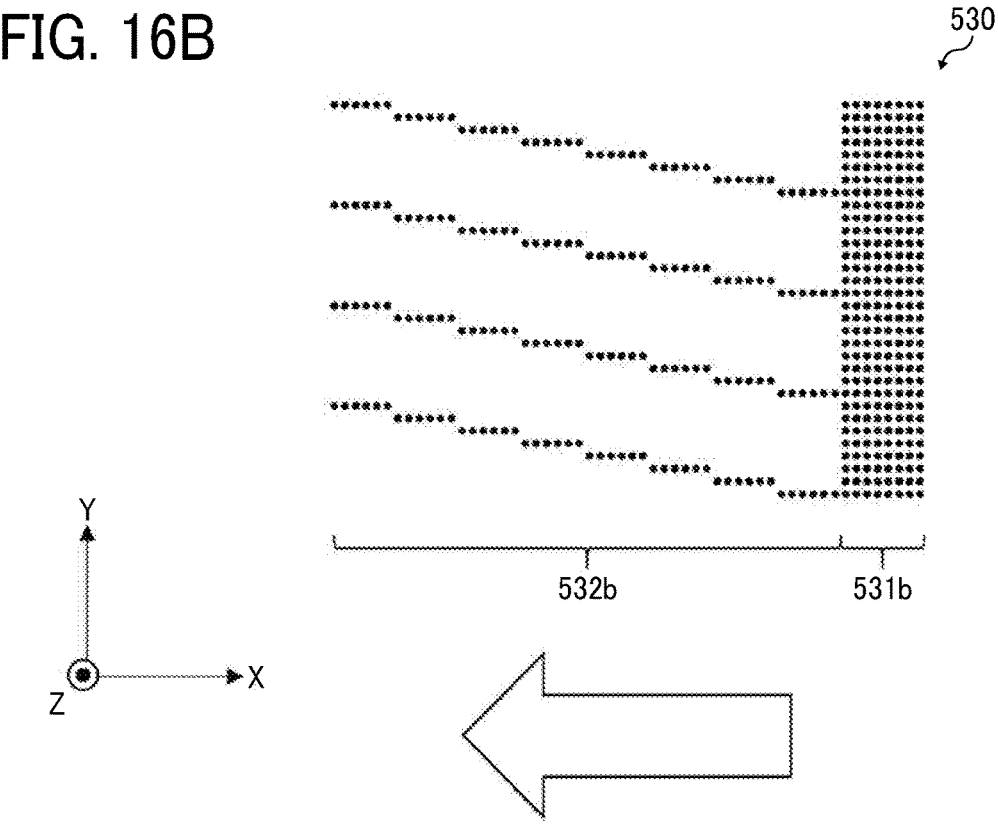

FIGS. 16A and 16B are examples of a pattern image 530 that can be used in the maintenance mode. Arrows illustrated in FIGS. 16A and 16B also indicate the scanning directions. The pattern image 530 changes a pattern to be used according to the scanning direction. Here, an example is illustrated in which nozzle arrays to discharge ink for the right scanning and the left scanning are separately used according to the scanning direction of the handheld printer 10. When the handheld printer 10 is scanned in the +X direction (right direction), the pattern image 530 is printed using the first nozzle array 181. In this case, the first recovery pattern 531a and the first confirmation pattern 532a are used as the pattern image 530.

When the handheld printer 10 is scanned in the −X direction (left direction), the pattern image 530 is printed using the second nozzle array 182. In this case, the second recovery pattern 531b and the second confirmation pattern 532b are used as the pattern image 530.

As illustrated in FIG. 16, when the scanning direction is different, the arrangements of the recovery pattern 531 and the confirmation pattern 532 in the printed pattern image 530 are reversed.

As described above, the maintenance pattern of the nozzle array actually used for the droplet discharging operation can be easily distinguished, thus enhancing the efficiency of the maintenance work performed by the user U.

Print Mode in Handheld Printer 10

Here, variations of an output mode of image formation in the handheld printer 10 according to the present embodiment are described. As described above, the handheld printer 10 has print modes including "horizontal writing" and "vertical writing" (see FIGS. 11A to 11C). The "horizontal writing" and "vertical writing" are examples of the single-pass mode described below. The handheld printer 10 has print modes called an "N-pass mode" and a "multi-pass mode" in addition to the single-pass mode.

First, the scanning of the handheld printer 10 in the "single-pass mode" is described again with reference to FIG. 17. The single-pass mode is a mode in which one scanning of the handheld printer 10 is performed in one direction to form an image on the sheet 30. In the single-pass mode, output processing of one piece of image data is executed in one scan. In other words, an image output in the single-pass mode is an image that can be output in one scan.

Figure 17:
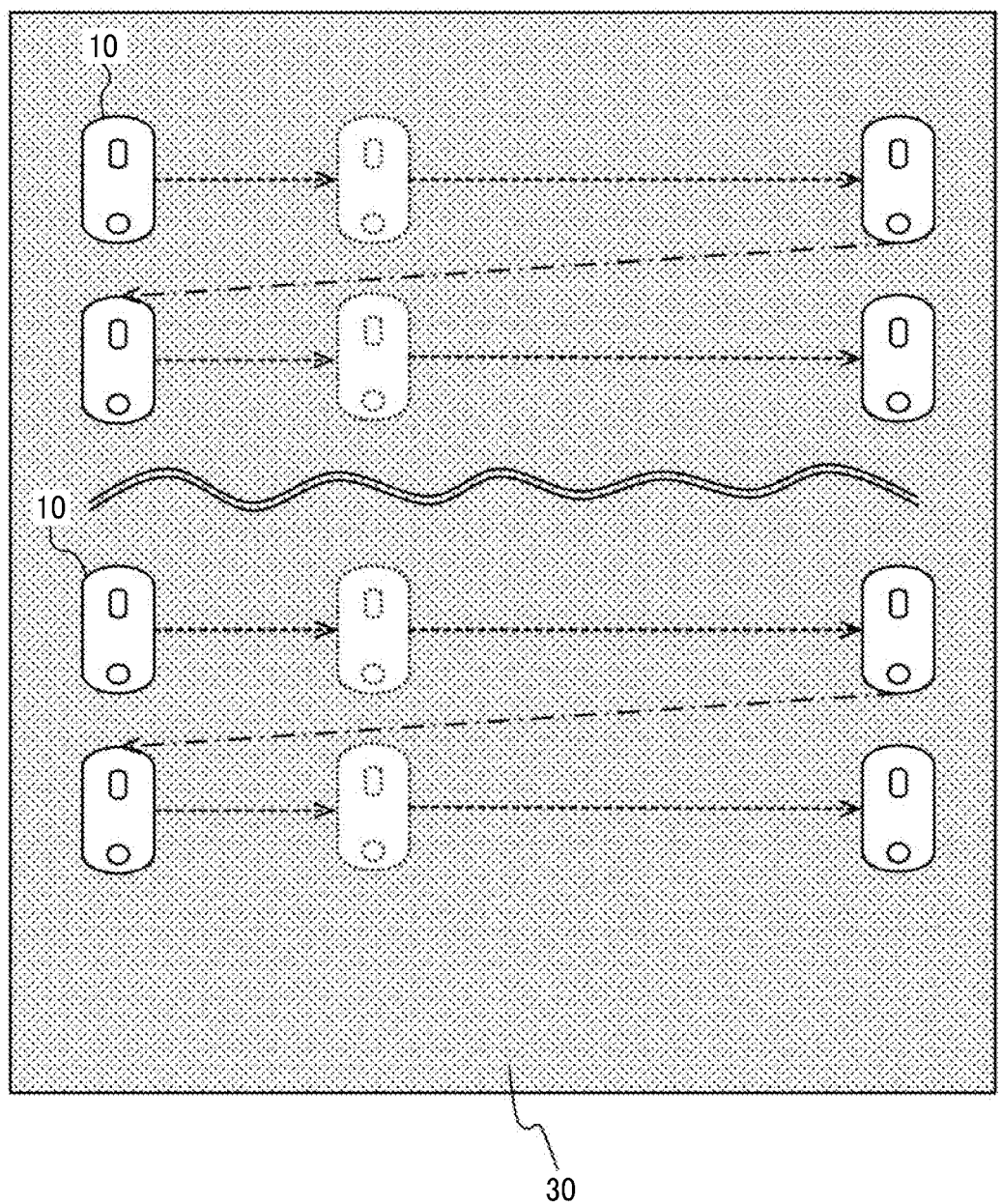
FIG. 17 is a schematic diagram illustrating an example of an output mode of image formation in the handheld printer.

In the single-pass mode, as illustrated in FIG. 17, scanning is performed linearly from one end of the sheet 30. When the handheld printer 10 reaches the opposite end of the sheet 30, the handheld printer 10 finishes image formation. When forming the next image, the handheld printer 10 starts scanning from the same side as when forming the previous image, and linearly scans the sheet 30 in the same direction (from the one end to the opposite end of the sheet 30). The single-pass mode is a mode suitable for forming a linear image such as a one-line character string or a barcode. Both of the "horizontal writing" and "vertical writing" described above are included in the single-pass mode.

Figure 18:
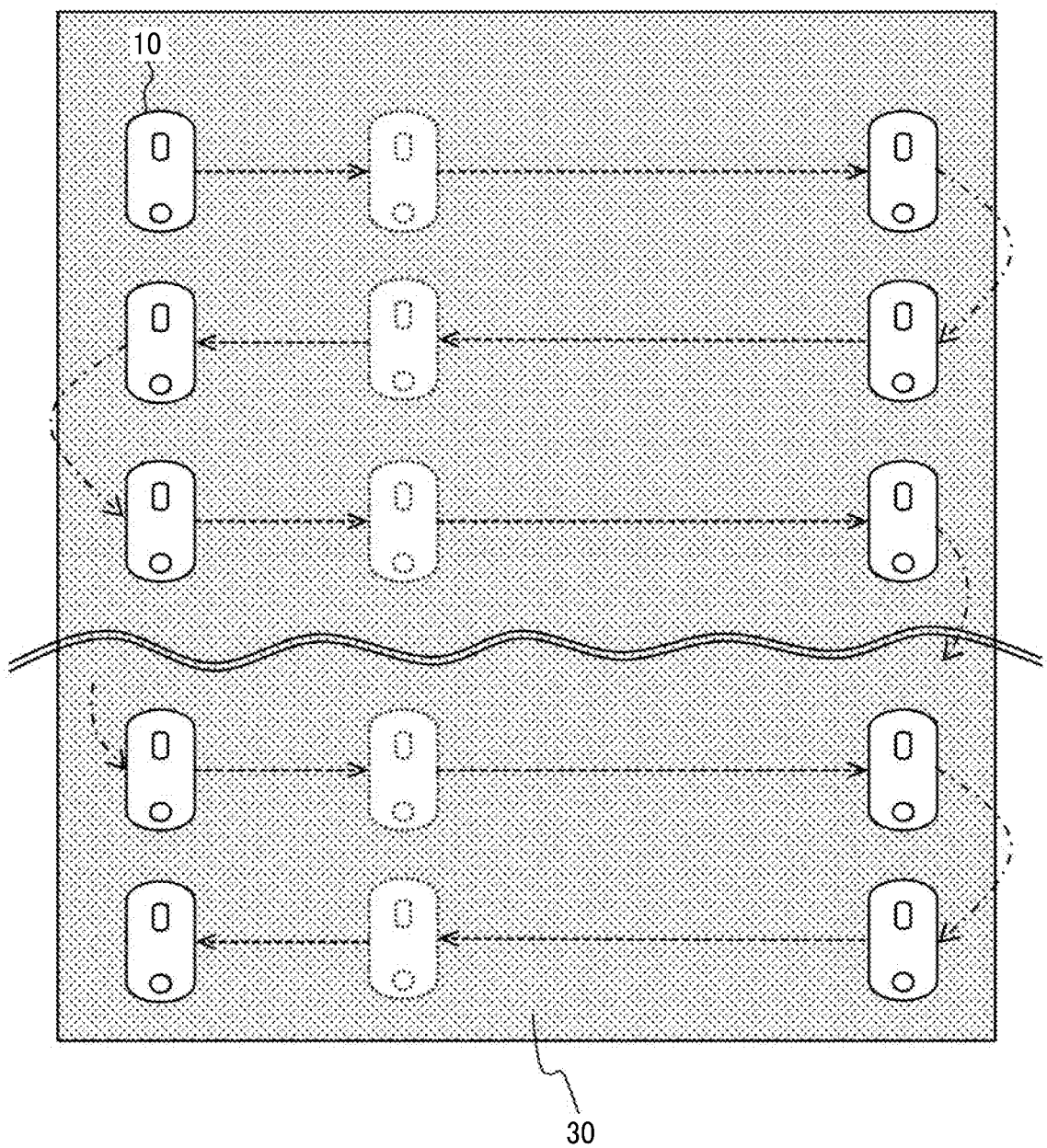
FIG. 18 is a schematic diagram illustrating another example of the output mode of image formation in the handheld printer.

Next, the scanning of the handheld printer 10 in the "N-pass mode" is described with reference to a schematic diagram of FIG. 18. The N-pass mode is a mode in which one scanning of the handheld printer 10 is performed in a plurality of directions to form an image on the sheet 30. As illustrated in FIG. 18, scanning is performed linearly from one end of the sheet 30. When the handheld printer 10 reaches the opposite end of the sheet 30, a line feed is performed (the position of the handheld printer 10 is shifted in a direction intersecting the scanning direction). Thereafter, scanning is performed linearly in the opposite direction. The N-pass mode is a mode in which the scanning and the line feed of the handheld printer 10 are repeatedly performed to form a plurality of lines of characters on the sheet 30.

Figure 19:
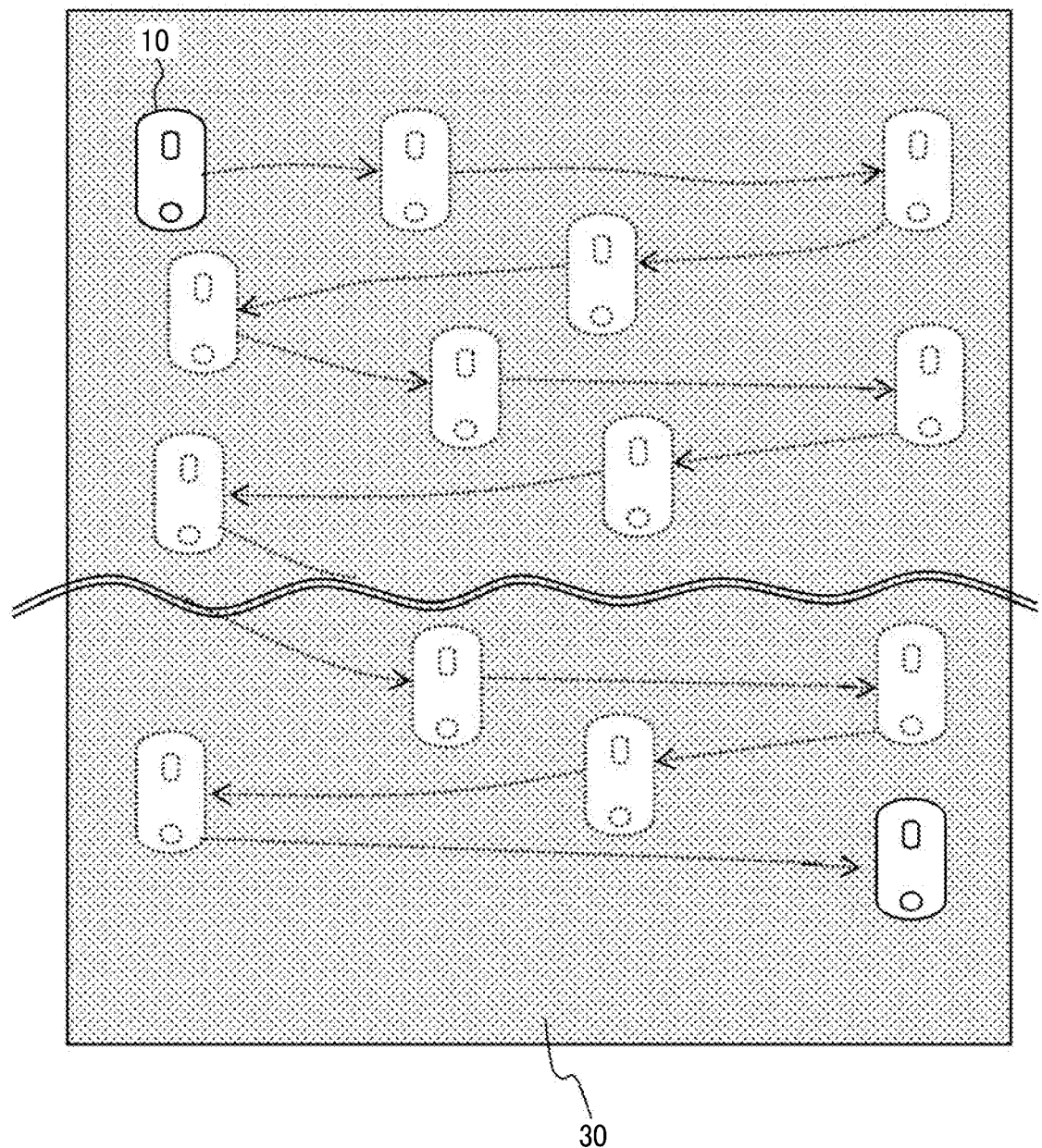
FIG. 19 is a schematic diagram illustrating still another example of the output mode of image formation in the handheld printer.

Next, the scanning of the handheld printer 10 in the "multi-pass mode" is described with reference to a schematic diagram of FIG. 19. The multi-pass mode is a mode in which an image is formed on the sheet 30 by freely repeating the scanning of the handheld printer 10 in a reciprocating manner. As illustrated in FIG. 19, assuming that the image forming process (printing process) is started from one end of the sheet 30, the scanning is performed in a reciprocating manner so as to fill the inside of the image area. The multi-pass mode is a mode in which, by repeating such reciprocating scanning, partial images are joined to form one image on the sheet 30.

Note that in the embodiments described above, when at least one of the functional units of the handheld printers 10 is implemented by execution of a program, the program is incorporated in advance in a read-only memory (ROM) or the like, thus being provided. The program executed in the handheld printers 10 according to any of the embodiments described above may be recorded on or stored in a computer-readable recording or storage medium such as a compact disc read-only memory (CD-ROM), a flexible disk (FD), a compact disc recordable (CD-R), or a digital versatile disk (DVD), in a file in installable or executable format, thus being providable. Alternatively, the program executed in the handheld printers 10 according to any of the embodiments described above may be stored in a computer connected to a network such as the Internet and downloaded via the network, thus being providable. Alternatively, the program executed in the handheld printers 10 according to any of the embodiments described above may be provided or distributed via a network such as the Internet. The program executed in the in the handheld printer 10 according the above-described embodiment is in the form of module including at least a portion of the above-described functional units. As actual hardware, when the CPU 111 of the control unit 101 reads out the program from the above-described memory (e.g., the DRAM 102) and executes the program, the above-described functional units are loaded and implemented (generated) on a main memory.

The present disclosure is not limited to the above-described embodiments, and can be modified in other embodiments, additions, modifications, deletions, and the like within a range that can be conceived by those skilled in the art. As long as the functions and effects of the present disclosure are exhibited, the functions and effects are included in the scope of the present disclosure. Various omissions, substitutions, changes, and combinations of constituent elements can be made without departing from the gist of the following embodiments.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming apparatus configured to form an image on a recording medium by scanning of the image forming apparatus by a user, the image forming apparatus comprising:
    an image forming device including a plurality of image forming arrays, each of which includes an image forming portion configured to form the image, each of the image forming arrays being an image printing array which prints by forming the image on the recording medium, and
    processing circuitry configured to set an image forming array to be used to form the image, according to a use mode of the image forming apparatus.

2. The image forming apparatus according to claim 1,
    wherein the processing circuitry sets a scanning mode for distinguishing a mode of scanning of the image forming apparatus by the user,
    wherein the processing circuitry sets the image forming array to be used, according to the scanning mode set based on a scanning direction of the image forming apparatus by the user.

3. The image forming apparatus according to claim 2,
wherein the image forming arrays are arranged in both sides with respect to a center of the image forming apparatus in the scanning direction, and
wherein the processing circuitry sets, as the image forming array to be used, one of the image forming arrays disposed on a front side in the scanning direction.

4. The image forming apparatus according to claim 1, further comprising a memory configured to store a use state including a use frequency of each of the image forming arrays,
wherein the processing circuitry sets the image forming array to be used according to the use state.

5. The image forming apparatus according to claim 1,
wherein the processing circuitry performs a maintenance-and-recovery operation on the image forming portion, and
wherein the processing circuitry switches an image pattern to be formed by the maintenance-and-recovery operation in accordance with a setting state of the image forming array to be used.

6. The image forming apparatus according to claim 5,
wherein the image pattern includes identification information for recognizing the image forming array to be used.

7. The image forming apparatus according to claim 6,
wherein the identification information is a character for identifying the image forming array to be used.

8. The image forming apparatus according to claim 6,
wherein the identification information is a character for identifying a position of the image forming array to be used.

9. The image forming apparatus according to claim 5,
wherein the image pattern is different between the image forming arrays.

10. A method for forming an image on a recording medium by scanning of an image forming apparatus by a user, the image forming apparatus including a plurality of image forming arrays, each of which includes an image forming portion configured to form the image, the method comprising:
setting an image forming array to be used to form the image, among the plurality of image forming arrays, according to a use mode of the image forming apparatus; and
printing the image on the recording medium using the image forming array which has been set.

11. The method according to claim 10, further comprising setting a scanning mode for distinguishing a mode of scanning of the image forming apparatus by the user,
wherein the setting the image forming array to be used includes setting the image forming array to be used, according to the scanning mode set based on a scanning direction of the image forming apparatus by the user.

12. The method according to claim 11,
wherein the image forming arrays are arranged in both sides with respect to a center of the image forming apparatus in the scanning direction, and
wherein the setting the image forming array to be used includes setting, as the image forming array to be used, one of the image forming arrays disposed on a front side in the scanning direction.

13. The method according to claim 10, further comprising storing a use state including a use frequency of each of the image forming arrays in a memory,
wherein the setting the image forming array to be used includes setting the image forming array to be used according to the use state.

14. The method according to claim 10, further comprising performing a maintenance-and-recovery operation on the image forming portion,
wherein the performing the maintenance-and-recovery operation includes switching an image pattern to be formed by the maintenance-and-recovery operation in accordance with a setting state of the image forming array to be used.

15. The method according to claim 14,
wherein the image pattern includes identification information for recognizing the image forming array to be used.

16. The method according to claim 15,
wherein the identification information is a character for identifying the image forming array to be used.

17. The method according to claim 15,
wherein the identification information is a character for identifying a position of the image forming array to be used.

18. The method according to claim 14,
wherein the image pattern is different between the image forming arrays.

19. A non-transitory recording medium storing computer readable code for causing an image forming apparatus to execute a process of forming an image on a recording medium by scanning of the image forming apparatus by a user, the image forming apparatus including a plurality of image forming arrays, each of which includes an image forming portion configured to form the image, the process comprising:
setting an image forming array to be used to form the image, among the plurality of image forming arrays, according to a use mode of the image forming apparatus; and
printing the image on the recording medium using the image forming array which has been set.

20. The image forming apparatus according to claim 1, wherein:
the plurality of image forming arrays include a plurality of image printing arrays each of which prints by depositing ink onto the recording medium using an inkjet recording head.

* * * * *